(12) United States Patent
Xiong et al.

(10) Patent No.: US 10,959,212 B2
(45) Date of Patent: Mar. 23, 2021

(54) INDICATION OF TDD UPLINK AND DOWNLINK CONFIGURATIONS

(71) Applicant: Apple Inc., Cupertino, CA (US)

(72) Inventors: Gang Xiong, Beaverton, OR (US); Hong He, Beijing (CN); Jong-Kae Fwu, Sunnyvale, CA (US); Ralf Bendlin, Portland, OR (US); Seunghee Han, San Jose, CA (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 15/747,270

(22) PCT Filed: Dec. 23, 2015

(86) PCT No.: PCT/US2015/000260
§ 371 (c)(1),
(2) Date: Jan. 24, 2018

(87) PCT Pub. No.: WO2017/034506
PCT Pub. Date: Mar. 2, 2017

(65) Prior Publication Data
US 2018/0220407 A1    Aug. 2, 2018

Related U.S. Application Data

(60) Provisional application No. 62/210,752, filed on Aug. 27, 2015.

(51) Int. Cl.
*H04W 72/04* (2009.01)
*H04L 5/00* (2006.01)
(Continued)

(52) U.S. Cl.
CPC ......... *H04W 72/0406* (2013.01); *H04L 5/001* (2013.01); *H04L 5/0035* (2013.01);
(Continued)

(58) Field of Classification Search
CPC ......... H04W 72/0406; H04W 72/0446; H04W 76/28; H04L 5/14; H04L 5/001;
(Continued)

(56) References Cited

U.S. PATENT DOCUMENTS 6,310,891 B1 * 10/2001 Dove .................... H04J 3/1617
370/470
9,253,233 B2 * 2/2016 Luby ................ H04N 21/23439
(Continued)

FOREIGN PATENT DOCUMENTS

WO    WO-2014044177 A1 *  3/2014    ........ H04W 72/0446
WO    WO2014044177 A1     3/2014
(Continued)

OTHER PUBLICATIONS

International Search Report and Written Opinion for International Patent Application No. PCT/US2015/000260 dated Apr. 26, 2016; 14 pages.

(Continued)

*Primary Examiner* — Andrew Lai
*Assistant Examiner* — Chuong M Nguyen
(74) *Attorney, Agent, or Firm* — Fish & Richardson P.C.

(57) ABSTRACT

Methods and apparatuses for communicating in a cellular communications network, including provision of a user equipment comprising processing circuitry to: receive from a first cell a control signal comprising a physical Time Division Duplex Uplink-Downlink configuration indicator channel (PTCICH); decode from the PTCICH a Time Division Duplex Uplink-Downlink (TDD UL-DL) configuration; and communicate with the first cell having applied the TDD UL-DL configuration in respect of subframes associated with the first cell, wherein: the PTCICH spans less than or equal to 32 Resource Elements. Also user equipment comprising processing circuitry to: receive a control signal (Continued)

from a first cell; decode the control signal received from the first cell thereby to determine a second cell TDD UL-DL configuration; and communicate with the second cell having applied the second cell TDD UL-DL configuration in respect of subframes associated with the second cell.

21 Claims, 9 Drawing Sheets

(51) Int. Cl.
*H04L 5/14* (2006.01)
*H04W 76/28* (2018.01)

(52) U.S. Cl.
CPC .............. *H04L 5/0092* (2013.01); *H04L 5/14* (2013.01); *H04L 5/1469* (2013.01); *H04W 72/0446* (2013.01); *H04W 76/28* (2018.02); *H04L 5/0073* (2013.01); *H04L 5/0096* (2013.01)

(58) Field of Classification Search
CPC ... H04L 5/0035; H04L 5/1469; H04L 5/0092; H04L 5/0096; H04L 5/0073
See application file for complete search history.

(56) References Cited

U.S. PATENT DOCUMENTS

| | | | | |
|---|---|---|---|---|
| 2013/0315114 A1* | 11/2013 | Seo | ...................... | H04J 3/1694 370/280 |
| 2014/0016519 A1* | 1/2014 | Kim | ...................... | H04L 1/1812 370/280 |
| 2014/0086112 A1* | 3/2014 | Stern-Berkowitz | ........................ | H04L 1/1822 370/280 |
| 2014/0301255 A1* | 10/2014 | Yin | ...................... | H04L 5/0092 370/280 |
| 2015/0098366 A1* | 4/2015 | Wu | ...................... | H04L 5/0035 370/278 |
| 2015/0245246 A1* | 8/2015 | Golitschek Edler von Elbwart | .............. | H04W 28/065 370/280 |
| 2015/0365968 A1* | 12/2015 | Kim | ................... | H04W 72/1268 370/280 |
| 2016/0020891 A1* | 1/2016 | Jung | ..................... | H04L 5/0064 370/280 |
| 2017/0195028 A1* | 7/2017 | Shimezawa | ........... | H04W 24/10 |

FOREIGN PATENT DOCUMENTS

WO    WO-2014161174 A1 * 10/2014 ............ H04W 80/00
WO    WO20140161174 A1    10/2014

OTHER PUBLICATIONS

Renesas Mobile Europe Ltd; "Discussion on signaling mechanisms for TDD UL-DL reconfiguration," Agenda Item: 7.333, 3GPP TSG RAN WG1 Meeting #72, R1-130422; St Julian's, Malta, Jan. 28-Feb. 1, 2013; 4 pages.

3GPP TS 36.212 V12.5.0 (Jun. 2015); "Technical Specification Group Radio Access Network; Evolved Universal Terrestrial Radio Access (E-UTRA); Multiplexing and channel coding (Release 12)," 94 pages.

PCT International Preliminary Report on Patentability in International Appln. No. PCT/US2015/000260, dated Mar. 8, 2018, 9 pages.

* cited by examiner

INDICATION OF TDD UPLINK AND DOWNLINK CONFIGURATIONS

CROSS REFERENCE TO RELATED APPLICATIONS

The present application is a national phase entry under 35 U.S.C. § 371 of International Application No. PCT/US2015/000260, filed Dec. 23, 2015, entitled "INDICATION OF TDD UPLINK AND DOWNLINK CONFIGURATIONS", which claims priority from U.S. Provisional Patent Application No. 62/210,752, filed Aug. 27, 2015, and entitled "MECHANISM TO INDICATE DOWNLINK AND UPLINK CONFIGURATION FOR 5G TDD SYSTEM", the entire disclosures of which are hereby incorporated by reference in their entireties.

TECHNICAL FIELD

Configurations relate to wireless communications, and more particularly, to indication of Time Division Duplex uplink and downlink configurations.

BACKGROUND

Ever greater demand is placed on telecommunication services, which are to accommodate increasingly more efficient and effective communication for increasing numbers of fixed and mobile devices.

Conventional indication of a Time Division Duplex Uplink-Downlink (TDD UL-DL) configuration by employing the Physical Downlink Control Channel (PDCCH) lacks flexibility and can result in unnecessary User Equipment (UE) power consumption. It is therefore desirable to provide more flexible and efficient indication of the TDD UL-DL configuration.

BRIEF DESCRIPTION OF DRAWINGS

Configurations described herein are illustrated, without limitation, by way of example, in the accompanying drawings.

DETAILED DESCRIPTION

Figure 1:
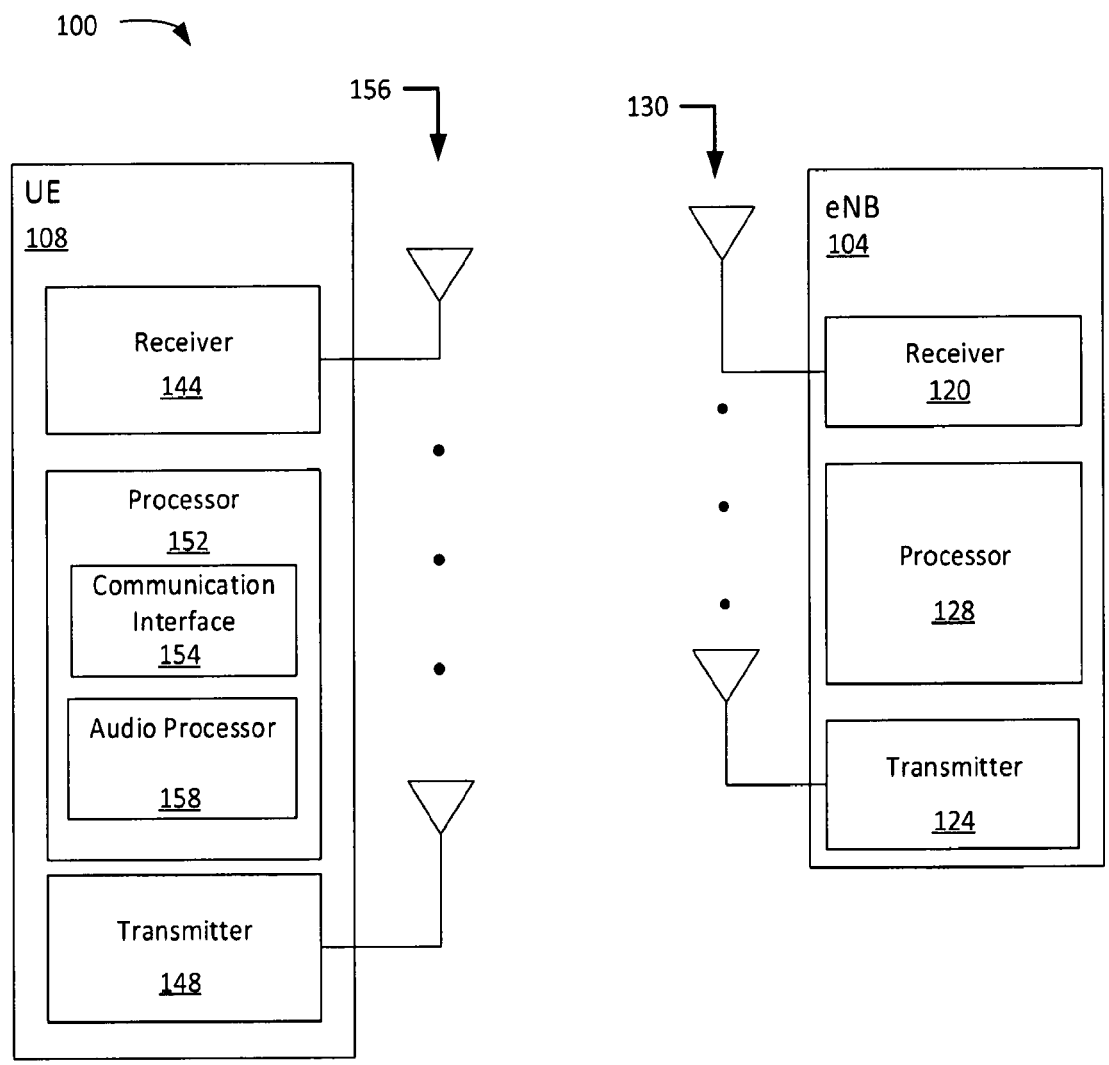
FIG. 1 shows an example of a user equipment and Evolved Node B (eNB)

Illustrative configurations include, but are not limited to, methods, systems, and apparatuses for transmitting a grantless PUSCH uplink.

Various aspects of the illustrative configurations are described using terms commonly employed by those skilled in the art to convey the substance of their work to others skilled in the art. However, it will be apparent to those skilled in the art that some alternate configurations may be practiced using with portions of the described aspects. For purposes of explanation, specific numbers, materials, and configurations are set forth in order to provide a thorough understanding of the illustrative configurations. However, it will be apparent to one skilled in the art that alternate configurations may be practiced without the specific details. In other instances, well-known features are omitted or simplified in order to not obscure the illustrative configurations.

Further, various operations will be described as multiple discrete operations, in turn, in a manner that is most helpful in understanding the illustrative configurations; however, the order of description should not be construed as to imply that these operations are necessarily order dependent. In particular, these operations need not be performed in the order of presentation.

The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific configurations have been illustrated and described herein, it will be appreciated by those of ordinary skill in the art that a wide variety of alternate and/or equivalent implementations may be substituted for the specific configurations shown and described. This application is intended to cover any adaptations or variations of the configurations discussed herein.

As used herein, the terms 'circuitry' and/or 'logic' may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some configurations, the circuitry may be implemented in, or functions associated with the circuitry may be implemented by, one or more software or firmware components. In some configurations, circuitry may include logic, at least partially operable in hardware.

There is disclosed a user equipment suitable for use in a cellular communications network, the user interface comprising processing circuitry to: receive a control signal from a first cell; decode the control signal received from the first cell thereby to determine a second cell TDD UL-DL configuration; and communicate with the second cell having applied the second cell TDD UL-DL configuration in respect of subframes associated with the second cell.

By determining a TDD UL-DL configuration in respect of the second cell based on a control signal from a first cell, there is achieved a greater degree of flexibility in the indication of a TDD UL-DL configuration.

The subframe length associated with the second cell may be different from the subframe length associated with the first cell. The subframe length associated with the second cell may be less than the subframe length associated with the first cell. By indicating the TDD UL-DL configuration via a first cell to apply in respect of communication with a second cell, the two cells having different subframe lengths, it is possible to save UE power by obviating the requirement for the UE to have to listen for a TDD UL-DL configuration in every flexible subframe of the second cell.

The second cell TDD UL-DL configuration may be decoded from the control signal received from the first cell. Thus for example, a specific second cell TDD UL-DL configuration may be communicated by the first cell, facilitating inter-cell communication of the TDD UL-DL configuration, notwithstanding the possibility of differing subframe lengths between cells.

The second cell TDD UL-DL configuration may be determined from a first cell TDD UL-DL configuration that is decoded from the control signal received from the first cell. Thus resources can be saved by obviating the requirement to communicate a specific second cell TDD UL-DL configuration, and instead deriving it from the first cell TDD UL-DL configuration.

In determining the second cell TDD UL-DL configuration, for each set of second cell subframes overlapping in time with a corresponding first cell subframe, the UL-DL configuration applied to the set of second cell subframes may be dependent on whether the corresponding first cell subframe is configured as an UL or DL subframe according to the first cell TDD UL-DL configuration. The UL-DL configuration applied to the set of second cell subframes may be set according to an UL or DL association pattern comprising a mixture of UL and DL subframes, the association pattern being selected based on the corresponding first cell subframe. The UL-DL configuration applied to the second set of second cell subframes may be an association pattern of repeated UL or DL subframes matching the corresponding first cell subframe. These mechanisms provide an efficient mechanism for determining the second cell TDD UL-DL configuration.

There is also disclosed a user equipment suitable for use in a cellular communications network, the user interface comprising processing circuitry to: receive from a first cell a control signal comprising a PDCCH and a separate physical Time Division Duplex Uplink-Downlink configuration indicator channel (PTCICH); decode from the PTCICH a TDD UL-DL configuration; and communicate with the first cell having applied the TDD UL-DL configuration in respect of subframes associated with the first cell.

Providing a separate TDD UL-DL configuration indicator channel (PTCICH) facilitates reduced UE power consumption by obviating the requirement to decode the PDCCH. Furthermore providing a dedicated channel for TDD UL-DL configuration indication facilitates greater flexibility.

The processing circuitry may be configured to: decode the PTCICH prior to any decoding of the PDCCH. This facilitates conservation of power by preventing unnecessary decoding.

The PTCICH may span less than or equal to 32 Resource Elements. This facilitates reduced power consumption and resource requirements associated with indication of the TDD UL-DL configuration.

There is also disclosed a user equipment suitable for use in a cellular communications network, the user interface comprising processing circuitry to: receive from a first cell a control signal comprising a physical TDD UL-DL configuration indicator channel (PTCICH); decode from the PTCICH a TDD UL-DL configuration; and communicate with the first cell having applied the TDD UL-DL configuration in respect of subframes associated with the first cell, wherein: the PTCICH spans less than or equal to 32 Resource Elements.

By providing a dedicated channel for specifying the TDD UL-DL configuration, in which the channel spans less than or equal to 32 Resource Elements, power and resource requirements associated with the indication of a TDD UL-DL configuration can be reduced.

The control signal may comprise a PDCCH channel.

The PTCICH may be present in one or more subframes of a frame, the number of the one or more subframes being less than the total number of subframes in a frame. The PTCICH may be present in the first subframe of every frame; and the decoded TDD UL-DL configuration may apply with respect to each subframe of the frame containing the PTCICH. The PTCICH may be present in a plurality of subframes of a frame; and the decoded TDD UL-DL configuration may apply with respect to the subframe containing the PTCICH and the remaining subsequent subframes up until the next subframe containing the PTCICH. Thus UE power and resources can be conserved by obviating the requirement for decoding the PTCICH in certain subframes.

The processing circuitry may be configured to: enable discontinuous reception (DRX) for a subframe in the event that the user equipment has no scheduled UL grant and no PTCICH is detected in the subframe. This facilitates reduced user equipment power requirements.

The processing circuitry may be configured to: decode the PDCCH for a subframe from the control signal in the event that the UE has no scheduled UL grant and a PTCICH is detected in the subframe.

The processing circuitry may be configured to: receive a second control signal from a second cell; and decode from the second control signal a plurality of selectable TDD UL-DL configurations, wherein: the TDD UL-DL configuration specifies one TDD UL-DL configuration from the plurality of selectable TDD UL-DL configurations.

The user equipment may comprise one or more of: a screen, a keyboard, a memory port, an antenna, a speaker, a graphics processor.

There is also disclosed an eNB for use in a cellular communications network, the eNB comprising processing circuitry to: determine based on a first cell TDD UL-DL configuration relating to subframes associated with a first cell provided by the eNB a second cell TDD UL-DL configuration relating to subframes associated with a second cell; and transmit a control signal to one or more UEs in communication with the first cell, wherein: the control signal comprises the second cell TDD UL-DL configuration.

There is also disclosed an eNB for use in a cellular communications network, the eNB comprising processing circuitry to: transmit a control signal to one or more UEs in communication with a first cell provided by the eNB, wherein: the control signal comprises a first cell TDD UL-DL configuration relating to subframes associated with the first cell and a second cell TDD UL-DL configuration relating to subframes associated with a second cell.

There is also disclosed an eNB for use in a cellular communications network, the eNB comprising processing circuitry to: transmit a control signal to one or more UEs in communication with a first cell provided by the eNB, wherein: the control signal comprises a PDCCH and a separate physical TDD UL-DL configuration indicator channel (PTCICH) comprising a first cell TDD UL-DL configuration relating to subframes associated with the first cell.

There is also disclosed an eNB for use in a cellular communications network, the eNB comprising processing circuitry to: transmit a control signal to one or more UEs in communication with a first cell provided by the eNB, wherein: the control signal comprises a physical TDD UL-DL configuration indicator channel (PTCICH) comprising a first cell TDD UL-DL configuration relating to subframes associated with the first cell; and the PTCICH spans less than or equal to 32 Resource is Elements.

The processing circuitry may be configured to: receive a control signal specifying second cell TDD UL-DL configuration information pertaining to a second cell; determine the first cell TDD UL-DL configuration based on the second cell TDD UL-DL configuration information.

There is also disclosed a method of specifying an UL-DL configuration in a cellular communications network, the method comprising: providing a first cell; providing a second cell; transmitting to one or more UEs in communication with the second cell a TDD UL-DL configuration with respect to subframes associated with the second cell based on a first cell TDD configuration with respect to subframes associated with the first cell.

There is also disclosed a method of specifying an UL-DL configuration in a cellular communications network, the method comprising: transmitting to one or more UEs in communication with a first cell a control signal comprising a PDCCH and a separate physical TDD UL-DL configuration indicator channel (PTCICH) comprising a TDD UL-DL configuration.

There is also disclosed a method of specifying an UL-DL configuration in a cellular communications network, the method comprising: transmitting to one or more UEs in communication with a first cell a control signal comprising a physical TDD UL-DL configuration indicator channel (PTCICH) comprising a TDD UL-DL configuration, wherein: the PTCICH spans less than or equal to 32 Resource Elements.

The first and second cells may be overlapping.

There is also disclosed a non-transient computer readable medium comprising computer program instructions that when executed on a processor perform any one of the above-described methods.

Figure 2:
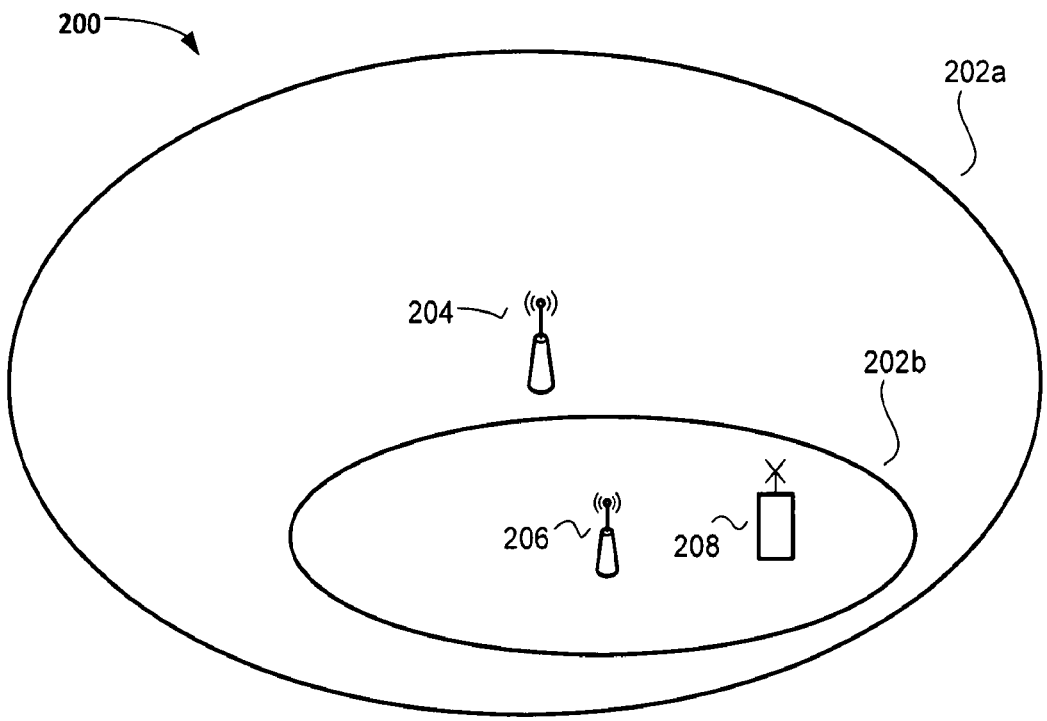
FIG. 2 shows an example of a cellular communications network employing a first cell and a second cell.

FIGS. 1 and 2 schematically illustrate a cellular communications network 100, 200. The cellular communications network, hereafter network, may be an access network of a 3rd Generation Partnership Project (3GPP) long-term evolution (LTE) or long-term evolution-advanced (LTE-A) network such as an evolved universal mobile telecommunication system (UMTS) terrestrial radio access network (E-UTRAN).

The network 100 may include a base station, e.g., evolved node base station (eNB) 104, configured to wirelessly communicate with one or more mobile device(s) or terminal(s), e.g., user equipment (UE) 108. In various configurations, the eNB 104 may be a fixed station (e.g., a fixed node) or a mobile station/node.

The eNB 104 may include a receiver 120 with which to receive signals from UE 108 via one or more antennas 130. eNB 104 may include a transmitter 124 with which to transmit signals to UE 108 via one or more antennas 130. eNB 104 may also include a processor 128 in communication with receiver 120 and transmitter 124 and configured to encode and decode information communicated by the signals.

In various configurations, the User Equipment (UE) 108 and/or the eNB 104 may include a plurality of antennas 156, 130 to implement a multiple-input-multiple-output (MIMO) transmission system, which may operate in a variety of MIMO modes, including single-user MIMO (SU-MIMO), multi-user MIMO (MU-MIMO), close loop MIMO, open loop MIMO or variations of smart antenna processing.

In various configurations, UE 108 comprises a transmitter 148 for transmitting signals to eNB 104 and a receiver 144 for receiving signals from the eNB 104. UE 108 further comprises a processor 152 coupled between a receiver 144 and a transmitter 148 and may include a communication interface 154 to encode and decode information communicated by the signals. Processor 152 may also include audio processor 158 to encode voice signals for transmission.

While the disclosed configurations are described with reference to an LTE network, the configurations may be used with other types of wireless access networks.

The configurations described herein may be used in a variety of applications including transmitters and receivers of a radio system, although the present disclosure is not limited in this respect. Radio systems specifically included within the scope of the present disclosure include, but are not limited to, network interface cards (NICs), network adaptors, fixed or mobile client devices, relays, base stations, femtocells, gateways, bridges, hubs, routers, access points, or other network devices. Further, the radio systems within the scope of the disclosure may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive configurations could be suitably applied.

FIG. 2 depicts a cellular communications network 200 in which a UE 208 is in communication with a first cell 202a provided by eNB 204 and a second overlapping cell 202b provided by eNB 206.

One response to the ever increasing demand placed on the cellular communications network 200 in terms of capacity and efficiency is to provide an anchor-booster cell arrangement, in which a first cell 202a constitutes an anchor cell and employs a first subframe length, and a second cell 202b constitutes a booster cell and employs a second subframe length smaller than the first subframe length. By increasing the subframe density, it is possible to reduce latency.

Figure 3:
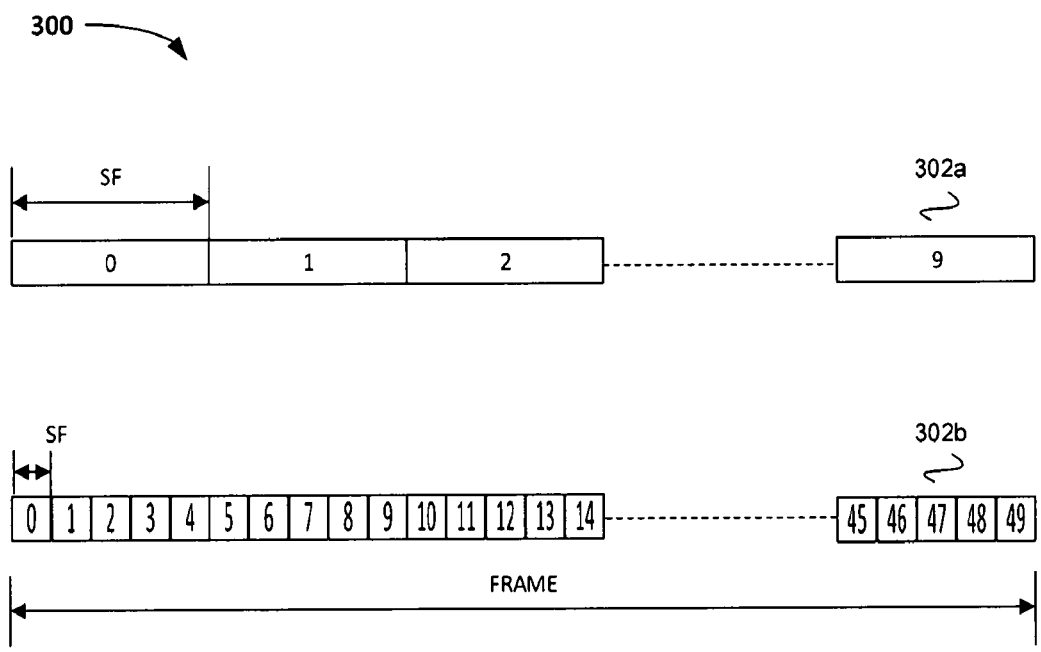
FIG. 3 shows an example of subframes in respect of first and second cells.

FIG. 3 shows an example of a possible subframe density variation that may be provided as between the first cell 202a, having subframes 302a, and a second cell 202b, having subframes 302b. In this example, one frame comprises 10 subframes 302a of the first length, and 50 subframes 302b of the second, smaller, length.

The challenge of conserving UE power and network resources is pronounced when employing an increase in subframe density; unless indication of TDD UL-DL is carefully managed, the UE may be required to rapidly, and potentially unnecessarily decode, the PDCCH.

Mobile communication has been developed significantly from early voice systems to a highly sophisticated integrated communication platform. 4G LTE networks are deployed in more than 100 countries to provide service in various spectrum band allocations depending on spectrum regime. Significant momentum has started to build around the idea of a next generation, i.e. fifth generation (5G), wireless communications technology.

The next generation wireless communication system, 5G, is to provide access to information and sharing of data anywhere, anytime by various users and applications. 5G is expected to be a unified network/system that target to meet vastly different and sometime conflicting performance dimensions and services. Such diverse multi-dimensional requirements are driven by different services and applications. Partly to address vastly diverse requirements, 5G aims to provide technical components and systems required to overcome the limits of legacy systems. In general, 5G will be developed based on 3GPP LTE-Adv with additional potential new Radio Access Technologies (RATs) to provide better, simple and seamless wireless connectivity solutions. 5G is intended to enable a great number of devices to be connected by wireless and deliver fast, rich contents and services.

Configurations disclosed herein include a mechanism to support an efficient design with dynamic and flexible downlink (DL) and uplink (UL) configuration, which may be applicable to a 5G dynamic TDD system.

In particular, there is disclosed: 1) a mechanism to indicate the DL/UL configuration which may be applicable to a 5G dynamic TDD system; and 2) a detailed design for a physical TDD configuration indicator channel (PTCICH), including procedure for the generation of the PTCICH, resource mapping schemes and the transmission time of the PTCICH.

Consider a dynamic TDD system in which only a limited number of subframes within each radio frame are reserved for DL or UL subframes, while other subframes in a radio frame can be allocated as flexible subframes, i.e., can be either DL or UL subframes depending on the TDD UL-DL configuration. One such arrangement with maximum scheduling flexibility is to have the UE treat all the subframes as flexible subframes being usable as DL or UL subframes with the exception of a very small number of fixed uplink subframes for random access procedures. In such a configuration, the UE may need to monitor all of the DL and flexible subframes and blindly decode the control channel, unless it is explicitly instructed to transmit in an UL subframe. Given then that the UE may need to decode a physical downlink control channel (xPDCCH) in every flexible and DL subframe, the UE power consumption can be undesirably high, particularly with the increased subframe density described in connection with FIG. 3 above. In addition, the false alarm rate may also be increased since UEs need to blindly decode the xPDCCHs in all subframes other than dedicated UL subframes.

Taking the subframe arrange depicted in 302b of FIG. 3, subframes 0 and 5 might be, for example, reserved for DL and UL subframes, whilst the other subframes might be allocated as flexible subframes, which can be either DL or UL subframes depending on a TDD UL-DL configuration to be indicated. No, fewer or greater subframes may be reserved in each frame.

To reduce the power consumption due to the monitoring of xPDCCH candidates in each flexible subframe in such a dynamic TDD system, it may be desirable to explicitly indicate the TDD UL-DL configuration. It may be indicated, for example, within one specific subframe of a radio frame.

In one configuration, the TDD UL-DL configuration for a radio frame can be indicated via the PDCCH, EPDCCH, xPDCCH and/or dedicated RRC signalling from one serving cell (e.g. primary cell, PCell) in an anchor-booster arrangement, wherein LTE or other cell (e.g. 5G cell) is served as an anchor/coverage cell and cmWave or mmWave is served as a booster cell. When PDCCH/EPDCCH/xPDCCH is used to signal the TDD UL-DL configuration, a design principle not dissimilar from that disclosed in Rel-12 Further Enhancements to LTE TDD for DL-UL Interference Management and Traffic Adaptation (eIMTA) may be employed. For instance, a DCI format with CRC scrambled by an eIMTA-Radio Network Temporary Identifier (RNTI) could explicitly indicate UL/DL reconfiguration and is only transmitted in the PDCCH of the PCell in the common search space (CSS). Further, if a UE is configured with two or more eIMTA-enabled cells, eIMTA on multiple carriers can be supported by transmitting multiple UL/DL configuration indicators in one DCI format carried in the PCell PDCCH CSS.

In another configuration, a new DCI format is introduced which is dedicated for the UL/DL configuration indication of serving cells, which may be 5G. Such a design is motivated owing to a different subframe frame length between a conventional LTE system and a 5G TDD system. Then, combing these two signals in a single DCI format may have a potential drawback that it may either result in unnecessary signaling overhead or may contrarily limit the UL/DL reconfiguration flexibility for 5G serving cells. Further, the capacity of legacy eIMTA DCI format is not large enough to support both LTE serving cells and 5G serving cells.

The design properties of this new DCI may include one or more of the following factors: to identify this new format from others having the same payload size, one new RNTI can be signaled through higher layer signaling to scramble the CRC bits; comprises one or more UL/DL configuration indication fields, where each field is used to indicate UL/DL configuration for one serving cell, which may be 5G; same payload size as one of Rel-12 DCI formats transmitted on CSS in LTE system e.g. DCI format 1C or 1A; and a set of DL/UL configuration might be pre-defined, which is indicated through one of DL/UL indication fields in this new DCI format. Alternatively, a bitmap method can be considered with each bit indicating the transmission direction of a subframe within a period.

Turning once again to FIG. 3, there is provided an example of a TDD UL-DL timing diagram which may be indicated via the PDCCH from an LTE anchor cell 202a to indicate the TDD UL-DL configuration for a cmWave/mmWave booster cell 202b. In this example, the PDCCH may be transmitted in the first 3 symbols of the first 0th subframe 302a within one frame in LTE. After successful decoding of the PDCCH in the LTE PCell, the UE obtains the DL/UL configuration for a booster cell in the same frame or in a later subframe as in the PCell.

For the cmWave/mmWave booster cell of this example, the number of subframes within one frame is large. In order to reduce the size of potential DL/UL configuration, the DL/UL configuration may only include the configuration for certain flexible subframes. The UE may assume that the other subframes are DL subframes.

To further reduce the overhead in the DCI format, it may be desirable to use xPDCCH to indicate one DL/UL configuration from a subset of DL/UL configurations, wherein the subset of the DL/UL configurations is semi-statically provided by a higher layer via dedicated RRC signalling or a 5G system information block (xSIB).

In another configuration, the UE may assume that the booster cell subframes within the same anchor cell subframe follow a predefined or configured pattern based on the anchor cell. In this case, after the UE obtains the DL/UL configuration from anchor cell via xPDCCH, it can determine the DL/UL configuration according to the predefined or configured pattern. The design principle can be easily extended and applied for the special subframe as defined in the LTE specification.

Figure 4:
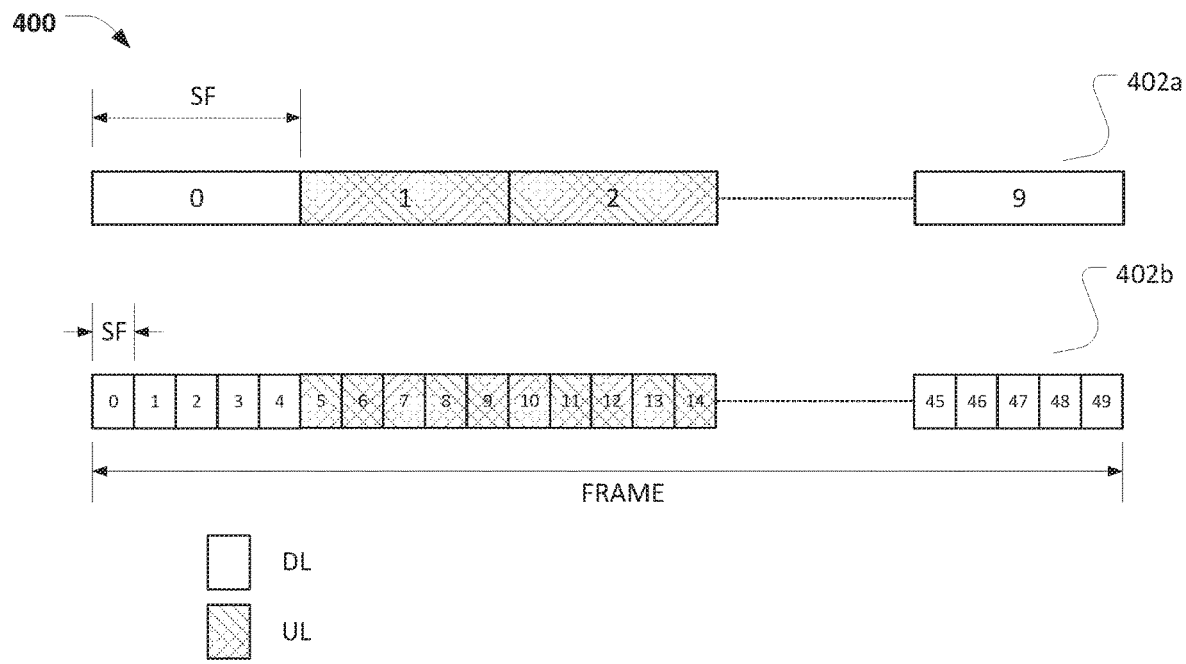
FIG. 4 shows an example TDD UL-DL configuration for first and second cells having different subframe lengths.

In one example, as shown in the FIG. 4, the booster cell subframes within the same anchor subframe follow the same Tx direction as the anchor cell.

Figure 5:
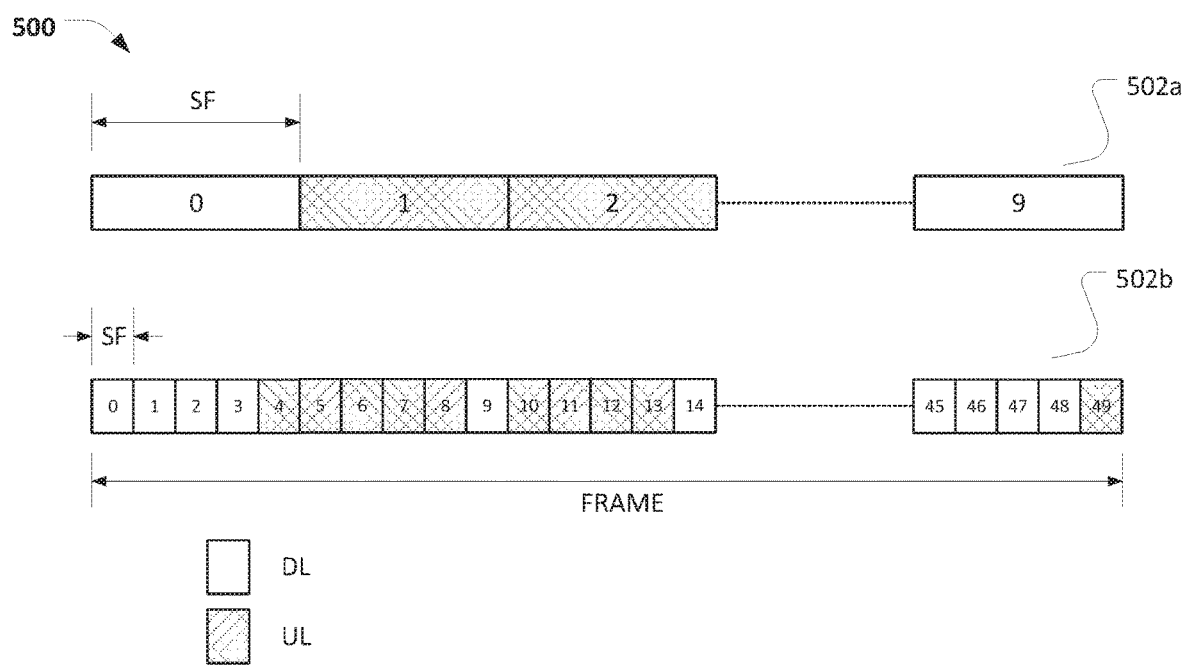
FIG. 5 shows another example of a TDD UL-DL configuration for first and second cells having different subframe lengths.

In another example, as shown in the FIG. 5, in the case when subframe direction is DL for the anchor cell, the subframe directions can be [DL DL DL DL UL] for the booster cell. In the case when the subframe direction is UL for the anchor cell, the subframe direction can be [UL UL UL UL DL] for the booster cell. Other subframe directions including special subframe and the number of subframe for the booster cell within the subframe for the anchor cell can be easily extended from this example.

In another configuration, the DL/UL configuration can be indicated in a dedicated physical channel/signal in the DL, i.e., physical TDD configuration indicator channel (PTCICH).

Be employing a dedicated channel, the resources associated with conveying the UL and DL configuration information may be made small. In this case, it may be beneficial to convey the UL and DL configuration information through the serving cell only.

The PTCICH may be transmitted in one or multiple subframes of one or a plurality of frames for dynamic TDD system. In one example, it may be only transmitted in the first subframe within one frame. Further, the configuration information carried by the PTCICH may indicate the DL/UL configuration for one whole frame or only the first half of the frame. In the latter case, the second half of the frame may use the same DL/UL configuration as in the first half of the frame.

In another example, the PTCICH may be transmitted in subframe 0 and 25 within one frame. The first and second PTCICH may be used to indicate the DL/UL configuration in the first half and second half of the frame, respectively.

In another configuration, the PTCICH is sent in every downlink subframe and the UE only attempts to blindly decode the PDCCH/EPDCCH/xPDCCH if it detects the PTCICH.

Figure 6:
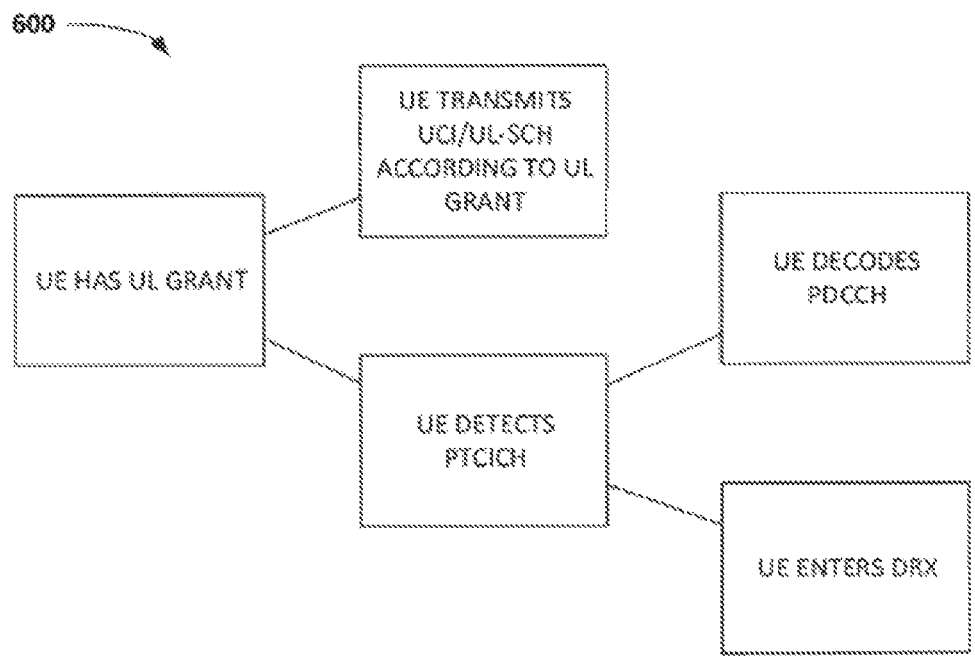
FIG. 6 shows an example method of determining whether to decode the PDCCH or enter DRX.

With reference to FIG. 6, in the event that the UE has a valid UL grant for the subframe, it sets its duplexer to transmission mode and sends uplink control information (UCI) and/or uplink data (UL-SCH) as instructed by the corresponding UL grant. Otherwise, the UE sets its duplexer to reception mode and tries to detect the PTCICH. If it detects the PTCICH, the UE blindly decodes the PDCCH/EPDCCH/xPDCCH. Otherwise, the UE can determine that the subframe is either an UL subframe or, alternatively, the PTCICH may indicate the subframe level as being on/off, i.e., the UE can sleep for the next remaining OFDM symbols in the subframe (DRX).

Figure 7:
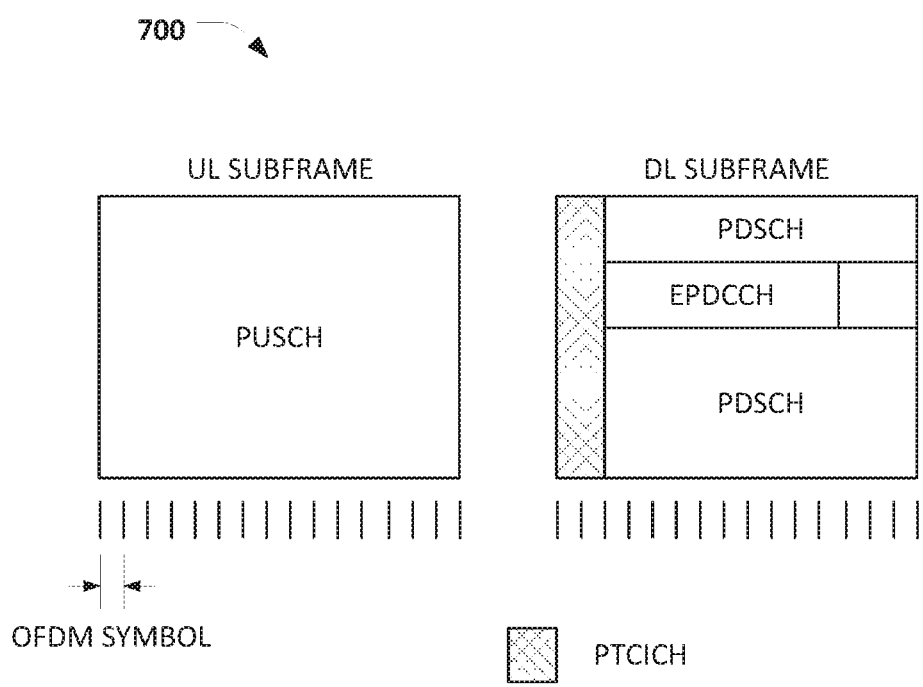
FIG. 7 shows example UL and DL subframes.

With reference to FIG. 7, the PTCICH may only change the duplex direction in respect of subframes other than the subframe containing the PTCICH.

In another configuration, the aforementioned mechanisms can be combined to indicate the DL/UL configuration. In one example, given a total N predefined DL/UL configurations in TDD system, a subset of DL/UL configurations can be signaled by either xPDCCH or dedicated RRC signalling from the PCell, while the PTCICH can be used to indicate one of the DL/UL configurations in the serving cell.

Thus a first cell may indicate a plurality of selectable TDD UL-DL configurations via a control signal, and a second cell may indicate using a control signal the TDD UL-DL configuration to be employed from the plurality of selectable TDD UL-DL configurations.

As an example, in the case when 10 DL/UL configurations are defined for TDD system in cmWave or mmWave band, only 4 DL/UL configurations are signaled by dedicated RRC signalling from PCell. Subsequently, the PTCICH is used to signal one of 4 DL/UL configurations in serving cell in cmWave and mmWave band.

As mentioned above, the PTCICH can be used to indicate the DL/UL configuration in one or multiple subframes of one or a plurality of frames for dynamic TDD system.

Figure 8:
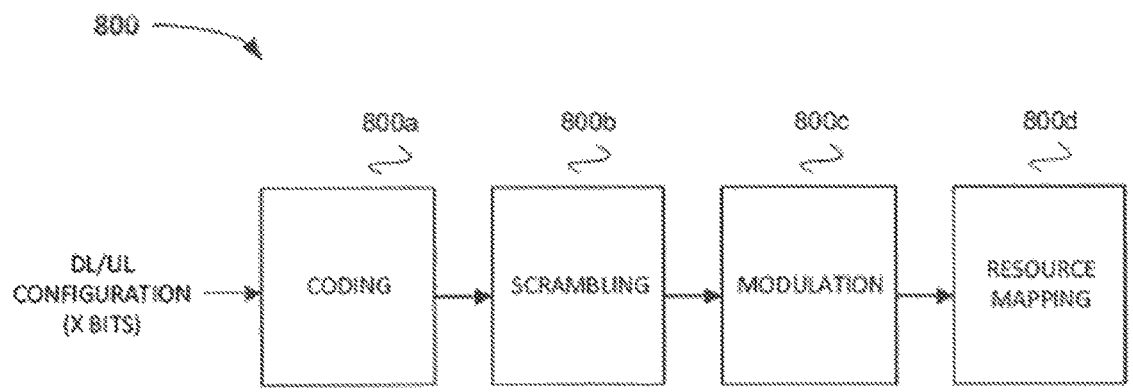
FIG. 8 shows an example method of generating a physical TDD UL-DL configuration indicator channel (PTCICH)

FIG. 8 illustrates an example of a method for the generation of the PTCICH. Although in the example, only the DL/UL configuration is included in the PTCICH, other information may optionally be combined therewith: for instance, the size of the control region; and/or the common xPDCCH configuration, etc.

Be employing a PTCICH with less than or equal to 32 Resource Elements, the PTCICH is smaller than the PDCCH, and thus UE power can be conserved by indicating the TDD UL-DL configuration over the PTCICH rather than the PDCCH and obviating the requirement to unnecessarily decode the larger PDCCH. Furthermore, it is pertinent to consider that no more than 4 information bits can be usefully employed for specifying a TDD UL-DL configuration. Referring to FIG. 8, taking X=4 information bits then, after coding, the encoded bits would consume 64 bits. Using QPSK, the number of symbols would then be 32. This would result in 32 REs being required for the PTCICH transmission.

Turning to FIG. 8, an example of a method of design for the PTCICH is as follows.

In 800a, a block coding is applied for the DL/UL configuration, i.e., X bits. In one example, the block coding scheme can be based on the channel coding for control frame indicator (CFI). In another example, the block coding scheme can be based on the Reed-Müller code used for the PUCCH format 2.

After the coding, a cell specific scrambling 800b is used to further randomize the interference. More specifically, the scrambling seed can be defined as a function of a physical cell ID and/or a virtual cell ID and/or subframe/slot/symbol index for the transmission of PTCICH. In one example, the scrambling seed can be given by:

$$c_{init} = \left(\left\lfloor \frac{n_s}{2} \right\rfloor + 1\right) \cdot (2N_{CELL}^{ID} + 1) \cdot 2^9 + N_{CELL}^{ID}$$

Where $n_s$ is the slot index and $N_{CELL}^{ID}$ is the cell ID. In the case of a 'single frequency network' type of operation wherein multiple eNodeBs transmit the PTCICH simultaneously on the same time and frequency resource, the scrambling sequence can be initialized as a function of virtual cell ID or a cluster/sub-cluster ID.

Subsequently, BPSK or QPSK can be used for the modulation 800c.

In the last block, modulated symbols are mapped 800d to the allocated resources. The resource mapping mechanism may be implemented in accordance with the following description.

The PTCICH can be transmitted in the first OFDM symbol or a plurality of OFDM symbols within the configured subframe.

Let us define the number of modulated symbols for the PTCICH as N. Further, N symbols are divided into K groups, where each group includes M=N/K symbols or subcarriers.

To exploit the benefit of frequency diversity, K groups are well separated within the system bandwidth, i.e., the frequency distance between two groups is $[N_{SC}/K]$, where $N_{SC}$ is the total number of subcarriers within the system bandwidth. Further, to avoid collisions between the transmissions of the PTCICH in neighboring cells, the location of the K groups in the frequency domain may depend on the physical-layer cell identity. In the case of "single frequency network" type of operation wherein multiple eNodeB may transmit the PTCICH in the same time/frequency resource, the location of the K groups in the frequency domain may depend on the virtual cell identity or cluster/sub-cluster identity, which may be configured by the higher layers.

Figure 9:
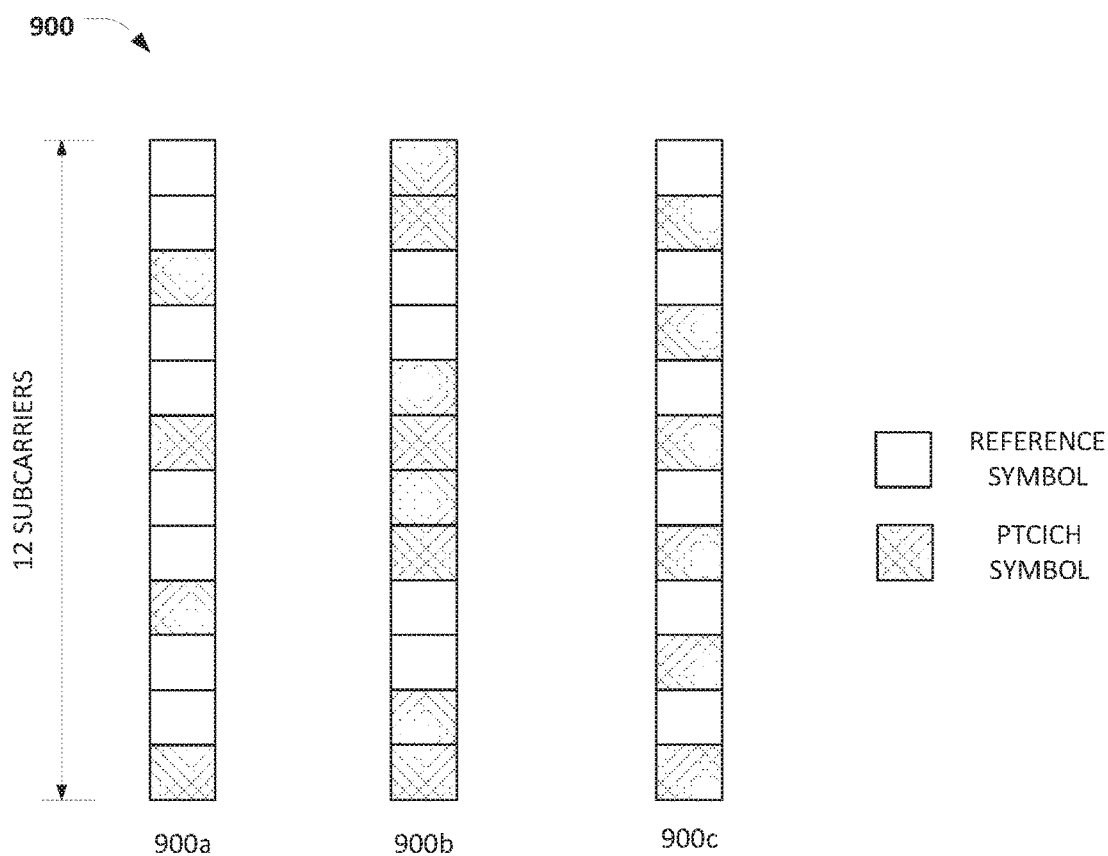
FIG. 9 shows an example of resource mapping for reference and PTCICH symbols.

In order to allow proper channel estimation and coherent detection, reference symbols (RS) can be inserted within each group for the transmission of PTCICH. The RSs can be based on cell specific RS (CRS) or DeModulation RS (DM-RS). FIG. 9 illustrates examples of resource mapping for data and reference symbols for the transmission of PTCICH. In the figure, for different options, different numbers of reference symbols are allocated within each group. 900a shows the use of ⅓ resource symbols, 900b shows the use of ⅔ resource symbols; and 900c shows the use of ½ resource symbols. Further, for DM-RS based transmission, the same beamforming weights are applied for the DM-RS symbols and data symbols used for the transmission of the PTCICH.

An alternative option is to allow non-coherent detection at the UE receiver. In this case, RS may not be required for the transmission of the PTCICH. More specifically, the modulated symbols occupies the allocated resource for the PTCICH.

For cmWave and mmWave bands, beamforming can compensate the large path loss and thereby improve the link budget and coverage. For the PTCICH which carries the DL/UL configuration, beamforming sweeping may be employed so that multiple UEs in the network can receive and decode the DL/UL configuration information successfully.

Figure 10:
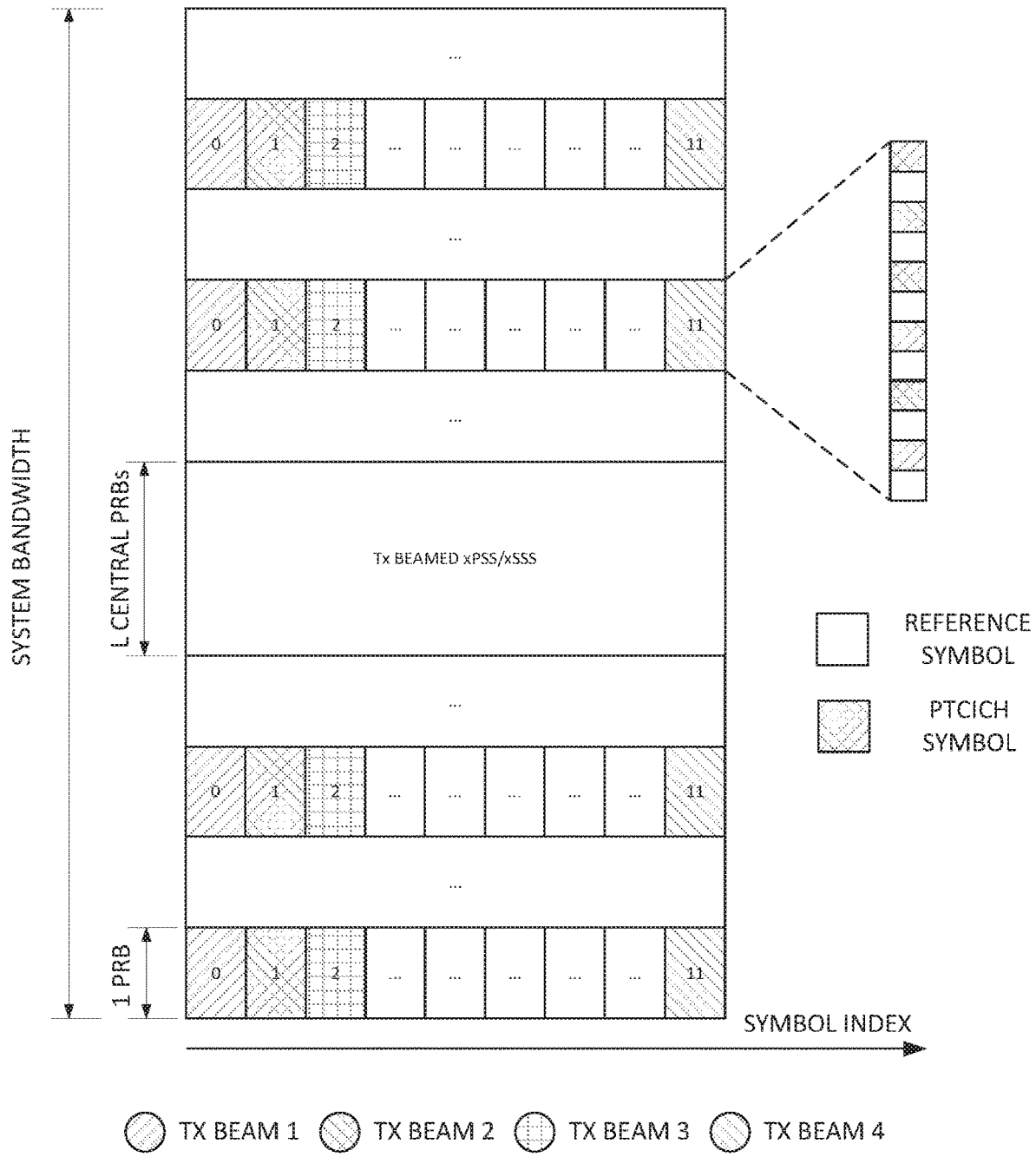
FIG. 10 shows an example of resource mapping for the PTCICH.

FIG. 10 illustrates one example of resource mapping schemes for the transmission of the PTCICH for a dynamic TDD system. In this example, the PTCICH is transmitted in the same subframe as the transmission of 5G primary synchronization channel (xPSS) and/or 5G secondary synchronization channel (xSSS), e.g., in the subframe 0 and/or 25 of one frame. Further, the PTCICH is equally spread into K sub-bands, wherein each sub-band occupies M PRB. In this example, K=4 and M=1. The PRB index for each sub-band is given by:

$$f(N_{CELL}^{ID}), \left[\frac{N_{PRB}}{4}\right] + f(N_{CELL}^{ID}), \left[\frac{2 \cdot N_{PRB}}{4}\right] + f(N_{CELL}^{ID}),$$

-continued
$$\left[\frac{3 \cdot N_{PRB}}{4}\right] + f(N_{CELL}^{ID})$$

Where $N_{PRB}$ is the number of PRBs in the system bandwidth and $f(N_{CELL}^{ID})$ indicates the starting frequency offset, which is defined as a function of cell ID, i.e., $N_{CELL}^{ID}$ As an example, $f(N_{CELL}^{ID})$ may be set using: $f(N_{CELL}^{ID})$=mod $(N_{CELL}^{ID}, 6)$.

Alternatively, the PTCICH may be transmitted in both edges of the system bandwidth. To ensure sufficient coverage, $M_0$ PRBs on each side may be provided for the transmission of PTCICH. Further, it may be repeated or Tx beamformed in the first subframe of the frame similar to the example as mentioned above.

The same PTCICH is repeated N times, wherein different Tx beamforming weights are applied on each OFDM symbol. In order to reduce the latency for decoding the PTCICH, eNodeB may use the same Tx beamforming weights of xPSS and/or xSSS to transmit the PTCICH. For instance, the same Tx beam #1 is applied for both xPSS and the PTCICH. After successful detection of xPSS signal, UE may attempt to decode the PTCICH in the same symbol.

Regarding the transmission timing for the PTCICH, several options can be considered as follows.

In one configuration, subframes that the UE shall monitor for the PTCICH can be defined as the downlink subframes or special subframes in TDD system satisfying:

$$\left(10 \times n_f + \left[\frac{n_s}{2}\right] - N_{OFFSET}\right) \bmod T_{PERIODICITY} = 0,$$

where $n_f$ and $n_s$ are radio frame number and slot number; $N_{OFFSET}$ and $T_{PERIODICITY}$ are the subframe offset and periodicity of the PTCICH, respectively.

For instance, $N_{OFFSET}$ and $T_{PERIODICITY}$ are defined by the parameter $I_{TDD\_Cfg}$, which is given in the Table 1. The skilled reader will recognize that other values of $I_{TDD\_Cfg}$, $N_{OFFSET}$ and d $T_{PERIODICITY}$ can be easily extended from the examples shown in the Table 1 below. Further, the configuration index $I_{TDD\_Cfg}$ can be predefined or configured by higher layers via a 5G master information block (xMIB), xSIB or dedicated RRC signalling.

TABLE 1

Periodicity and subframe offset configuration for the PTCICH

| Configuration Index $I_{TDD\_Cfg}$ | Periodicity (ms) $T_{PERIODICITY}$ | Subframe Offset $N_{OFFSET}$ |
|---|---|---|
| 0-4 | 5 | $I_{TDD\_Cfg}$ |
| 5-14 | 10 | $I_{TDD\_Cfg}$-5 |
| 15-34 | 20 | $I_{TDD\_Cfg}$-15 |
| 35-74 | 40 | $I_{TDD\_Cfg}$-35 |
| 75-154 | 80 | $I_{TDD\_Cfg}$-75 |

The periodicity, e.g., TDD-Configuration-Periodicity for the PTCICH could be predefined or configured by higher layers via xMIB, xSIB or dedicated RRC signalling. Further, within this configured periodicity, the UE may monitor a set of subframes for the PTCICH.

More specifically, a subframe bit map with parameter 'subframeBitMap' can be used to signal the subframes that the UE can monitor for the PTCICH, which can be repeated within the configured periodicity. For instance, subframeBitMap='0011000011' and the configured periodicity in subframes is 20. In this case, the first and second radio frames have the same subframe bit map, and subframes #2, #3, #8 and #9 in each frame are allocated for the transmission of the PTCICH. Similar to the periodicity, subframeBitMap can be predefined or configured by higher layers via xMIB, xSIB or dedicated RRC signalling. This scheme may be more appropriate for the flexible duplex system wherein certain subframes can be reserved as flexible subframe.

Another bit map signaling could be used to indicate that a set of subframes within a period (e.g. a radio frame of 5G) are reserved for UL transmission or a special subframe with one partial UL transmission with fixed length.

Benefits obtainable with some of the above-described configurations can be, as follows. A mechanism can be provided for the network to align the resources used for the UCI (e.g. ACK/NACK) transmission across neighboring cells, which benefits in UCI detection performance due to relatively stable interference in the absence of cross-link interference. The UE can expect that the scheduled UCI transmission is limited to these UL subframes so that the false detection rate of UL grant triggering UCI feedback can be further reduced. This is important especially when considering HARQ-ACK retransmission is not supported for UCI (incl. ACK/NACK, CSI, beam indication e.g.) and a common understanding on HARQ-ACK bits ordering between UE and eNodeB can be guaranteed. Further, the UE is not required to monitor xPDCCH on these indicated UL subframe so that power consumption reduction can be achieved. As these subframes are dynamically indicated by NW through either DCI formats or higher layer signaling, the number of this subframes can vary between frames and is fully controlled by network.

Figure 11:
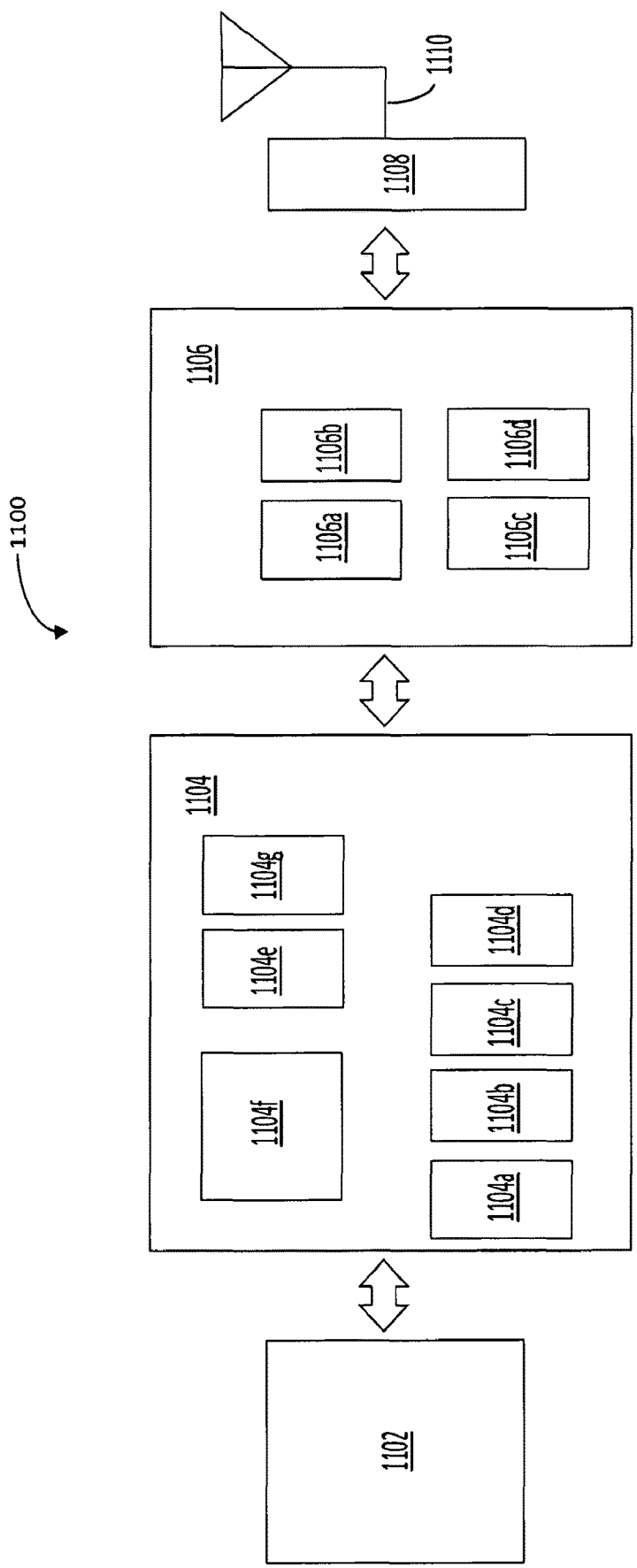
FIG. 11 shows an example system capable of implementing the configurations described herein.

Configurations described herein may be implemented into a system using any suitably configured hardware and/or software. FIG. 11 illustrates example components of an electronic device 1100. In certain configurations, the electronic device 1100 may be, implement, be incorporated into, or otherwise be a part of a user equipment (UE), an evolved NodeB (eNB), or some other electronic device. In some configurations, the electronic device 1100 may include application circuitry 1102, baseband circuitry 1104, Radio Frequency (RF) circuitry 1106, front-end module (FEM) circuitry 1108 and one or more antennas 1110, coupled together at least as shown.

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1104 may include circuitry such as, but not limited to, one or more single-core or multi-core processors. The baseband circuitry 1104 may include one or more baseband processors and/or control logic to process baseband signals received from a receive signal path of the RF circuitry 1106 and to generate baseband signals for a transmit signal path of the RF circuitry 1106. Baseband processing circuitry 1104 may interface with the application circuitry 1102 for generation and processing of the baseband signals and for controlling operations of the RF circuitry 1106. For example, in some configurations, the baseband circuitry 1104 may include a second generation (2G) baseband processor 1104a, third generation (3G) baseband processor 1104b, fourth generation (4G) baseband processor 1104c, and/or other baseband processor(s) 1104d for other existing generations, generations in development or to be developed in the future (e.g., fifth generation (5G), 6G, etc.). The baseband circuitry 1104 (e.g., one or more of baseband processors 1104a-d) may handle various radio control functions that enable communication with one or more radio networks via the RF circuitry 1106. The radio control functions may include, but are not limited to, signal modulation/demodulation, encoding/decoding, radio frequency shifting, etc.

In some configurations, modulation/demodulation circuitry of the baseband circuitry 1104 may include Fast-Fourier Transform (FFT), preceding, and/or constellation mapping/demapping functionality. In some configurations, encoding/decoding circuitry of the baseband circuitry 104 may include convolution, tail-biting convolution, turbo, Viterbi, and/or Low Density Parity Check (LDPC) encoder/decoder functionality. Configurations of modulation/demodulation and encoder/decoder functionality are not limited to these examples and may include other suitable functionality in other configurations.

In some configurations, the baseband circuitry 1104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1104e of the baseband circuitry 1104 may be configured to run elements of the protocol stack for signaling of the PHY, MAC, RLC, PDCP and/or RRC layers. In some configurations, the baseband circuitry may include one or more audio digital signal processor(s) (DSP) 1104f. The audio DSP(s) 1104f may be include elements for compression/decompression and echo cancellation and may include other suitable processing elements in other configurations.

The baseband circuitry 1104 may further include memory/storage 1104g. The memory/storage 1104g may be used to load and store data and/or instructions for operations performed by the processors of the baseband circuitry 1104. Memory/storage for one configuration may include any combination of suitable volatile memory and/or non-volatile memory. The memory/storage 1104g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 104g may be shared among the various processors or dedicated to particular processors.

Components of the baseband circuitry may be suitably combined in a single chip, a single chipset, or disposed on a same circuit board in some configurations. In some configurations, some or all of the constituent components of the baseband circuitry 104 and the application circuitry 102 may be implemented together such as, for example, on a system on a chip (SOC).

In some configurations, the baseband circuitry 1104 may provide for communication compatible with one or more radio technologies. For example, in some configurations, the baseband circuitry 1104 may support communication with an evolved universal terrestrial radio access network (EUTRAN) and/or other wireless metropolitan area networks (WMAN), a wireless local area network (WLAN), a wireless personal area network (WPAN). Configurations in which the baseband circuitry 104 is configured to support radio communications of more than one wireless protocol may be referred to as multi-mode baseband circuitry.

RF circuitry 1106 may enable communication with wireless networks using modulated electromagnetic radiation through a non-solid medium. In various configurations, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some configurations, the RF circuitry 1106 may include a receive signal path and a transmit signal path. The receive signal path of the RF circuitry 1106 may include mixer circuitry 106a, amplifier circuitry 1106b and filter circuitry 1106c. The transmit signal path of the RF circuitry 106 may include filter circuitry 1106c and mixer circuitry 1106a. RF circuitry 106 may also include synthesizer circuitry 1106d for synthesizing a frequency for use by the mixer circuitry 1106a of the receive signal path and the transmit signal path. In some configurations, the mixer circuitry 1106a of the receive signal path may be configured to down-convert RF signals received from the FEM circuitry 1108 based on the synthesized frequency provided by synthesizer circuitry 106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1104 for further processing. In some configurations, the output baseband signals may be zero-frequency baseband signals, although this is not a requirement. In some configurations, mixer circuitry 1106a of the receive signal path may comprise passive mixers, although the scope of the configurations is not limited in this respect.

In some configurations, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1104 and may be filtered by filter circuitry 1106c. The filter circuitry 1106c may include a low-pass filter (LPF), although the scope of the configurations is not limited in this respect.

In some configurations, the mixer circuitry 106a of the receive signal path and the mixer circuitry 1106a of the transmit signal path may include two or more mixers and may be arranged for quadrature downconversion and/or upconversion respectively. In some configurations, the mixer circuitry 1106a of the receive signal path and the mixer circuitry 1106a of the transmit signal path may include two or more mixers and may be arranged for image rejection (e.g., Hartley image rejection). In some configurations, the mixer circuitry 1106a of the receive signal path and the mixer circuitry 1106a may be arranged for direct downconversion and/or direct upconversion, respectively. In some configurations, the mixer circuitry 1106a of the receive signal path and the mixer circuitry 1106a of the transmit signal path may be configured for super-heterodyne operation.

In some configurations, the output baseband signals and the input baseband signals may be analog baseband signals, although the scope of the configurations is not limited in this respect. In some alternate configurations, the output baseband signals and the input baseband signals may be digital baseband signals. In these alternate configurations, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode configurations, a separate radio IC circuitry may be provided for processing signals for each spectrum, although the scope of the configurations is not limited in this respect.

In some configurations, the synthesizer circuitry 1106d may be a fractional-N synthesizer or a fractional N/N+1 synthesizer, although the scope of the configurations is not limited in this respect as other types of frequency synthesizers may be suitable. For example, synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some configurations, the synthesizer circuitry 1106d may be a fractional N/N+1 synthesizer.

In some configurations, frequency input may be provided by a voltage controlled oscillator (VCO), although that is not a requirement. Divider control input may be provided by either the baseband circuitry 1104 or the applications processor 1102 depending on the desired output frequency. In some configurations, a divider control input (e.g., N) may be determined from a look-up table based on a channel indicated by the applications processor 1102.

Synthesizer circuitry 1106d of the RF circuitry 1106 may include a divider, a delay-locked loop (DLL), a multiplexer and a phase accumulator. In some configurations, the divider may be a dual modulus divider (DMD) and the phase accumulator may be a digital phase accumulator (DPA). In some configurations, the DMD may be configured to divide the input signal by either N or N+1 (e.g., based on a carry out) to provide a fractional division ratio. In some example configurations, the DLL may include a set of cascaded, tunable, delay elements, a phase detector, a charge pump and a D-type flip-flop. In these configurations, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some configurations, synthesizer circuitry 1106d may be configured to generate a carrier frequency as the output frequency, while in other configurations, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some configurations, the output frequency may be a LO frequency (fLO). In some configurations, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 106 for transmission by one or more of the one or more antennas 1110.

In some configurations, the FEM circuitry 1108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110.

In some configurations, the electronic device 1100 may include additional elements such as, for example, memory/storage, display, camera, sensor, and/or input/output (I/O) interface.

In configurations wherein the electronic device 1100 is, implements, is incorporated into, or is otherwise part of an evolved NodeB (eNodeB or eNB), the baseband circuitry 1104 may be to identify one or more parameters related to a TDD uplink (UL)/downlink (DL) configuration in one radio frame and/or subframe of a fifth generation (5G) time division duplex (TDD) network; and the RF circuitry 1106 may be to transmit a downlink control information (DCI) format or a physical TDD configuration indicator channel (PTCICH) transmission in accordance with the one or more parameters.

In configurations where the electronic device 1100 is, implements, is incorporated into, or is otherwise part of a user equipment (UE), the RF circuitry 1106 may be to receive a downlink control information (DCI) format and/or a physical TDD configuration indicator channel (PTCICH) transmission from an evolved NodeB (eNodeB) in a fifth generation (5G) time division duplex (TDD) cellular network; and the baseband circuitry 1104 may be to process the DCI format and/or PTCICH transmission in accordance with one or more parameters related to a TDD uplink (UL)/downlink (DL) configuration in one radio frame and/or subframe.

The electronic device 1100 of FIG. 11 may be configured to perform one or more processes, techniques, and/or methods as described herein, or portions thereof.

For example, in configurations where the electronic device is, implements, is incorporated into, or is otherwise part of an eNodeB, or a portion thereof, the process may include identifying, by an evolved NodeB (eNodeB) in a fifth generation (5G) time division duplex (TDD) network, one or more parameters related to a TDD uplink (UL)/downlink (DL) configuration in one radio frame and/or subframe; and transmitting, by the eNodeB, a downlink control information (DCI) format or a physical TDD configuration indicator channel (PTCICH) transmission in accordance with the one or more parameters.

For example, in configurations where the electronic device is, implements, is incorporated into, or is otherwise part of a UE, or a portion thereof, the process may include receiving, by a user equipment (UE) in a fifth generation (5G) time division duplex (TDD) network, a downlink control information (DCI) format and/or a physical TDD configuration indicator channel (PTCICH) transmission from an evolved NodeB (eNodeB); and processing, by the UE, the DCI format and/or PTCICH transmission in accordance with one or more parameters related to a TDD uplink (UL)/downlink (DL) configuration in one radio frame and/or subframe.

Figure 12:
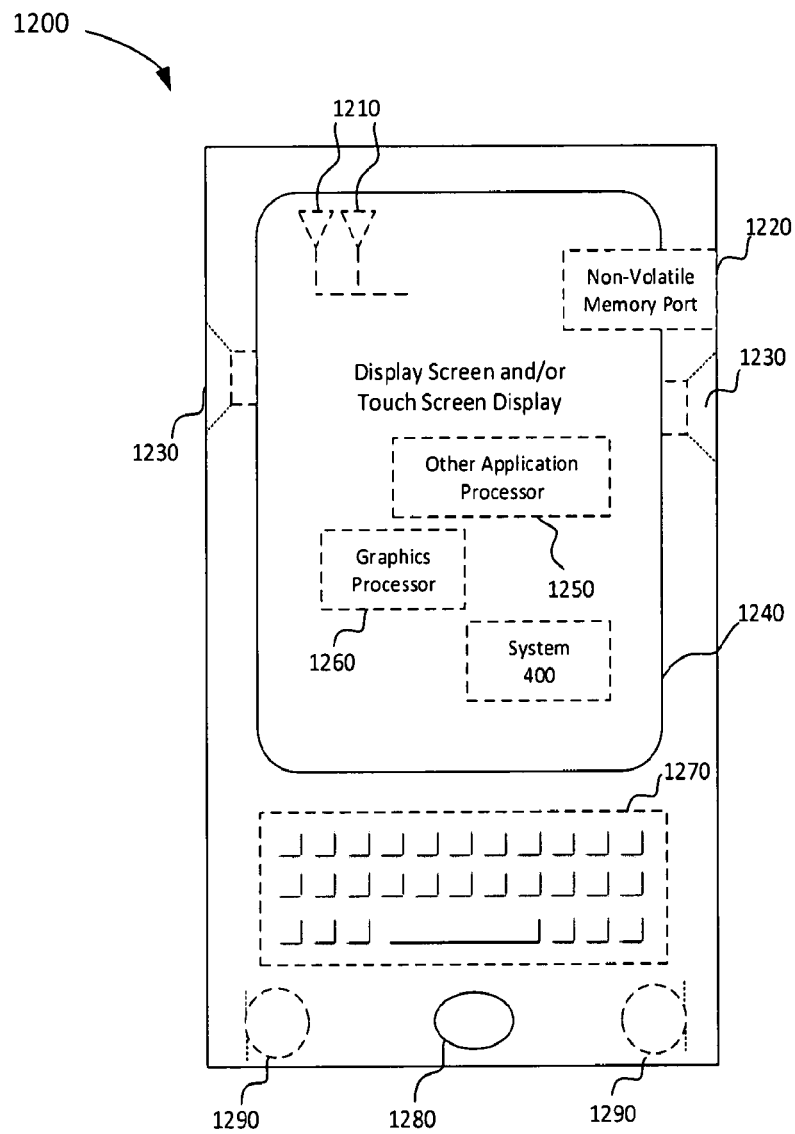
FIG. 12 shows an example wireless apparatus configured for communicating in a cellular communications network and capable of implementing the configurations described herein.

FIG. 12 shows a UE in the specific form of a mobile device 1200, which may be implemented using system 1100. In various configurations, user interfaces can include, but are not limited to, a display 1240 (e.g. a liquid crystal display, a touch screen display, etc.), a speaker 1230, a microphone 1290, one or more cameras 1280 (e.g. a still camera and/or video camera), a flashlight (e.g. a light emitting diode flash), and a keyboard 1270.

The processor 152 of the UE 108 or processor 128 of the eNB depicted in FIG. 1 may be configured to perform one or more processes, techniques, and/or methods as described herein, or portions thereof.

Figure 13:
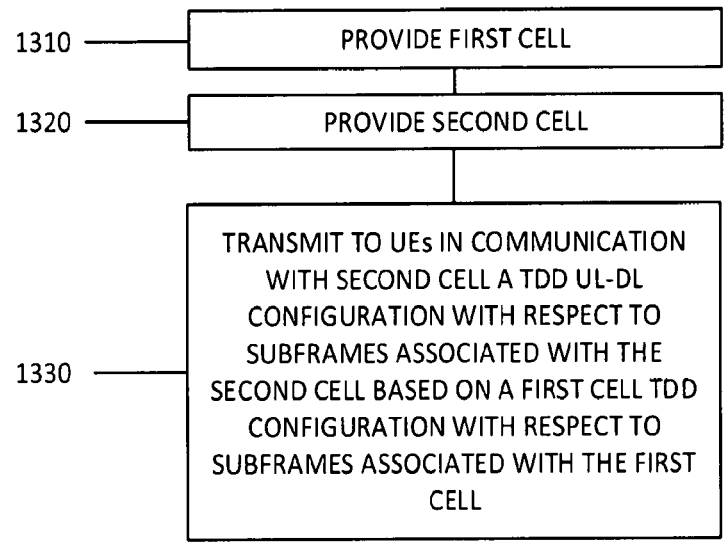
FIG. 13 shows an example method of indicating a TDD UL-DL configuration.
Figure 14:
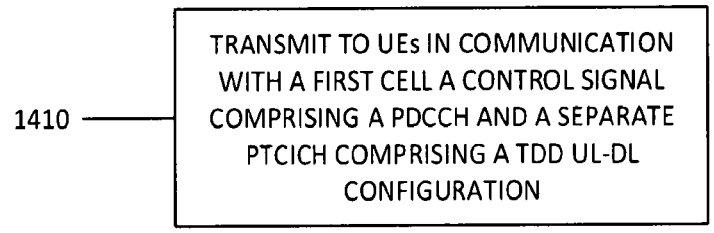
FIG. 14 shows an example method of indicating a TDD UL-DL configuration employing a PTCICH in combination with a PDCCH.
Figure 15:
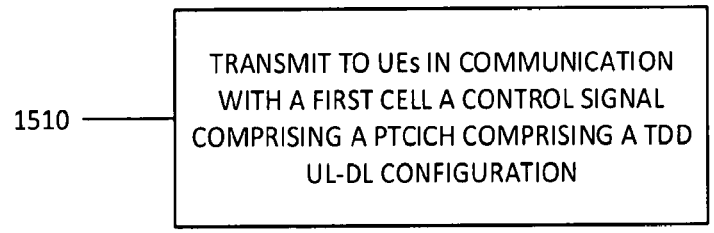
FIG. 15 shows an example method of indicating a TDD UL-DL configuration employing a PTCICH.

Example methods are depicted in FIGS. 13 to 15.

In the method of FIG. 13: a first cell is provided 1310; a second cell is provided 1320; and a transmission is made to one or more UEs in communication with the second cell, the transmission comprising a TDD UL-DL configuration with respect to subframes associated with the second cell based on a first cell TDD UL-DL configuration with respect to subframes associated with the first cell. Thus, for example, a control signal may be transmitted by an eNB providing the second cell, the control signal comprising a second cell TDD UL-DL configuration, which is based on a first cell TDD UL-DL applying in respect of the first cell.

In the method of FIG. 14, in 1410 a transmission is made to one or more UEs in communication with a first cell comprising a control signal comprising a PDCCH and a separate PTCICH, the PTCICH comprising a TDD UL-DL configuration.

In FIG. 15, in 1510 a transmission is made to one or more UEs in communication with a first cell a control signal comprising a PTCICH comprising a TDD UL-DL configuration.

Configurations can be realized according to the following examples.

Example 1 may include a system and method of wireless communication for a fifth generation (5G) Time Division Duplex (TDD) system, comprising: identifying, by an eNodeB, one or more parameters related to downlink (DL) and uplink (UL) configuration in one radio frame or subframe; and transmitting, by the eNodeB, Downlink control information (DCI) format or physical TDD configuration indicator channel (PTCICH) in accordance with the one or more parameters.

Example 2 may include the method of example 1 or some other example herein, wherein TDD UL/DL configuration for a radio frame is indicated via physical downlink control channel (PDCCH) or enhanced PDCCH (EPDCCH) or 5G PDCCH (xPDCCH) or dedicated RRC signalling or a combination of the above options from one serving cell in an anchor booster arrangement.

Example 3 may include the method of example 2 or some other example herein, wherein a DCI format with CRC scrambled by eIMTA-Radio Network Temporary Identifier (RNTI) in the LTE specification is reused to indicate TDD UL/DL reconfiguration for TDD system.

Example 4 may include the method of example 2 or some other example herein, wherein a new DCI format is introduced to indicate TDD UL/DL reconfiguration for TDD system; wherein a new RNTI is signaled through higher layers signaling to scramble the CRC bits; and wherein same payload size as one of Rel-12 DCI formats is transmitted on common search space (CSS) in the LTE system.

Example 5 may include the method of example 2 or some other example herein, wherein one UL/DL configuration is selected from a subset of UL/DL configurations, wherein the subset of UL/DL configurations is semi-statically provided by higher layer via dedicated RRC signalling or 5G system information block (xSIB).

Example 6 may include the method of example 1 or some other example herein, wherein the booster cell subframes within the same anchor cell subframe follow a predefined or configured pattern as the anchor cell.

Example 7 may include the method of example 1 or some other example herein, wherein TDD DL/UL configuration is indicated via PTCICH.

Example 8 may include the method of example 7 or some other example herein, wherein the PTCICH is transmitted in one or multiple subframes of one or a plurality of frames for dynamic TDD system.

Example 9 may include the method of example 7 or some other example herein, wherein the PTCICH is transmitted in every downlink subframe and the UE only attempts to blindly decode the PDCCH/EPDCCH/xPDCCH if it detects the PTCICH.

Example 10 may include the method of example 1 or some other example herein, wherein the method of example 2, example 6 and/or example 7 is combined to indicate the TDD DL/UL configuration.

Example 11 may include the method of example 10 or some other example herein, wherein a subset of TDD DL/UL configurations is signaled by either so xPDCCH or dedicated RRC signalling from PCell, and the PTCICH is used to indicate one of the TDD DL/UL configurations in the serving cell.

Example 12 may include the method of example 7 or some other example herein, wherein for the generation of the PTCICH, a block coding is applied for the TDD UL/DL configuration; wherein a cell specific scrambling is applied after the coding; wherein binary phase-shift keying (BPSK) or quadrature phase-shift keying (QPSK) is used for the modulation; and wherein modulated symbols are mapped to the allocated resources.

Example 13 may include the method of example 12 or some other example herein, wherein the scrambling seed can be defined as a function of a physical cell ID and/or a virtual cell ID and/or subframe/slot/symbol index for the transmission of PTCICH.

Example 14 may include the method of example 12 or some other example herein, wherein in the case of single frequency network type of operation wherein multiple eNodeBs transmit the PTCICH simultaneously on the same time and frequency resource, the scrambling sequence can be initialized as a function of virtual cell ID or a cluster/sub-cluster ID.

Example 15 may include the method of example 12 or some other example herein, wherein PTCICH modulated symbols are divided into K groups, where each group includes M=N/K symbols or subcarriers; wherein K groups are well separated within the system bandwidth; and wherein the location of the K groups in the frequency domain may depend on the physical-layer cell identity.

Example 16 may include the method of example 12 or some other example herein, wherein reference symbols (RS) may or may not be inserted within each group for the transmission of PTCICH.

Example 17 may include the method of example 12 or some other example herein, wherein for cmWave and mmWave bands, repeated or beamforming sweeping is used for the transmission of PTCICH.

Example 18 may include the method of example 17 or some other example herein, wherein the eNodeB may use the same Tx beamforming weights of 5G primary synchronization signal (xPSS) and/or 5G secondary synchronization signal (xSSS) to transmit the PTCICH in the same symbol.

Example 19 may include the method of example 7 or some other example herein, wherein the subframes that UE shall monitor for the PTCICH is defined as the downlink subframes or special subframes in TDD system satisfying:

$$\left(10 \times n_f + \left[\frac{n_s}{2}\right] - N_{OFFSET}\right) \bmod T_{PERIODICITY} = 0,$$

where $n_f$ and $n_s$ are radio frame number and slot number; $N_{OFFSET}$ and $T_{PERIODICITY}$ are the subframe offset and periodicity of the PTCICH, respectively; and wherein configuration index is predefined or configured by higher layers via 5G master information block (xMIB), xSIB or dedicated RRC signalling.

Example 20 may include the method of example 7 or some other example herein, wherein the periodicity, e.g., TDD-Configuration-Periodicity for the PTCICH transmission is predefined or configured by higher layers via xMIB, xSIB or dedicated RRC signalling; and wherein a subframe bit map with parameter "subframeBitMap" is used to signal the subframes that UE needs to monitor for the PTCICH within this configured periodicity, which may be repeated within the configured periodicity.

Example 21 may include the method of example 7 or some other example herein, wherein another bit map signaling is used to indicate that a set of subframes within a period (e.g. a radio frame of 5G) are reserved for UL transmission or a special subframe with one partial UL transmission with fixed length.

Example 22 may include a method comprising: identifying, by an evolved NodeB (eNodeB) in a fifth generation (5G) time division duplex (TDD) network, one or more parameters related to a TDD uplink (UL)/downlink (DL) configuration in one radio frame and/or subframe; and transmitting, by the eNodeB, a downlink control information (DCI) format or a physical TDD configuration indicator channel (PTCICH) transmission in accordance with the one or more parameters.

Example 23 may include the method of example 22 or some other example herein, wherein the TDD UL/DL configuration for a radio frame is indicated via physical downlink control channel (PDCCH) or enhanced PDCCH (EPDCCH) or 5G PDCCH (xPDCCH) or dedicated RRC signalling or a combination of the above options from one serving cell in an anchor booster arrangement.

Example 24 may include the method of example 23 or some other example herein, wherein a DCI format with a cyclic redundancy check (CRC) scrambled by an enhanced interference mitigation and traffic adaptation (eIMTA)-Radio Network Temporary Identifier (RNTI) is reused to indicate a TDD UL/DL reconfiguration for the TDD network.

Example 25 may include the method of example 23 or some other example herein, wherein a new DCI format is introduced to indicate a TDD UL/DL reconfiguration for the TDD network; wherein a new RNTI is signaled through higher layers signaling to scramble the CRC bits; and wherein a same payload size as one of Rel-12 DCI formats is transmitted on or in a common search space (CSS).

Example 26 may include the method of example 23 or some other example herein, wherein the UL/DL configuration is selected from a subset of UL/DL configurations, wherein the subset of UL/DL configurations is semi-statically provided by higher layer via dedicated radio resource control (RRC) signalling or 5G system information block (xSIB).

Example 27 may include the method of example 22 or some other example herein, wherein booster cell subframes within a same anchor cell subframe follow a predefined or configured pattern as the anchor cell.

Example 28 may include the method of example 22 or some other example herein, wherein the TDD DL/UL configuration is indicated via the PTCICH transmission.

Example 29 may include the method of example 28 or some other example herein, wherein the PTCICH is transmitted in one or multiple subframes of one or a plurality of frames for a dynamic TDD system.

Example 30 may include the method of example 28 or some other example herein, wherein the PTCICH is transmitted in every downlink subframe and the UE only attempts to blindly decode the PDCCH/EPDCCH/xPDCCH if it detects the PTCICH.

Example 31 may include the method of example 22 or some other example herein, wherein the method of example 23, example 27 and/or example 28, or some other example herein, is combined to indicate the TDD DL/UL configuration.

Example 32 may include the method of example 31 or some other example herein, wherein a subset of TDD DL/UL configurations is signaled by either xPDCCH or dedicated RRC signalling from a primary cell (PCell), and the PTCICH is used to indicate one of the TDD DL/UL configurations in the serving cell.

Example 33 may include the method of example 28 or some other example herein, wherein for the generation of the PTCICH, a block coding is applied for the TDD UL/DL configuration; wherein a cell specific scrambling is applied after the coding; wherein binary phase-shift keying (BPSK) or quadrature phase-shift keying (QPSK) is used for the modulation; and wherein modulated symbols are mapped to the allocated resources.

Example 34 may include the method of example 33 or some other example herein, wherein the scrambling seed can be defined as a function of a physical cell ID and/or a virtual cell ID and/or subframe/slot symbol index for the transmission of PTCICH.

Example 35 may include the method of example 33 or some other example herein, wherein in the case of single frequency network type of operation wherein multiple eNodeBs transmit the PTCICH simultaneously on the same time and frequency resource, the scrambling sequence can be initialized as a function of virtual cell ID or a cluster/sub-cluster ID.

Example 36 may include the method of example 33 or some other example herein, wherein PTCICH modulated symbols are divided into K groups, where each group includes M=N/K symbols or subcarriers; wherein K groups are well separated within the system bandwidth; and wherein the location of the K groups in the frequency domain may depend on the physical-layer cell identity.

Example 37 may include the method of example 33 or some other example herein, wherein reference symbols (RS) may or may not be inserted within each group for the transmission of PTCICH.

Example 38 may include the method of example 33 or some other example herein, wherein for centimeter wave (cmWave) and/or millimeter Wave (mmWave) bands, repeated or beamforming sweeping is used for the transmission of PTCICH.

Example 39 may include the method of example 38 or some other example herein, wherein the eNodeB may use the same Tx beamforming weights of 5G primary synchronization signal (xPSS) and/or 5G secondary synchronization signal (xSSS) to transmit the PTCICH in the same symbol.

Example 40 may include the method of example 28 or some other example herein, wherein the subframes that UE shall monitor for the PTCICH is defined as the downlink subframes or special subframes in TDD system satisfying:

$$\left(10 \times n_f + \left[\frac{n_s}{2}\right] - N_{OFFSET}\right) \bmod T_{PERIODICITY} = 0,$$

where $n_f$ and $n_s$ are radio frame number and slot number; N OFFSET and $T_{PERIODICITY}$ are the subframe offset and periodicity of the PTCICH, respectively; and wherein configuration index is predefined or configured by higher layers via 5G master information block (xMIB), 5G system information block (xSIB) and/or dedicated RRC signalling.

Example 41 may include the method of example 28 or some other example herein, wherein the periodicity, e.g., TDD-Configuration-Periodicity for the PTCICH transmission is predefined or configured by higher layers via xMIB, xSIB or dedicated RRC signalling; and wherein a subframe bit map with parameter "subframeBitMap" is used to signal the subframes that UE needs to monitor for the PTCICH within this configured periodicity, which may be repeated within the configured periodicity.

Example 42 may include the method of example 28 or some other example herein, wherein another bit map signaling is used to indicate that a set of subframes within a period (e.g. a radio frame of 5G) are reserved for UL transmission or a special subframe with one partial UL transmission with fixed length.

Example 43 may include an evolved NodeB (eNodeB) comprising:

baseband circuitry to identify one or more parameters related to a TDD uplink (UL)/downlink (DL) configuration in one radio frame and/or subframe of a fifth generation (5G) time division duplex (TDD) network; and radio frequency (RF) circuitry coupled with the baseband circuitry, the RF circuitry to transmit a downlink control information (DCI) format or a physical TDD configuration indicator channel (PTCICH) transmission in accordance with the one or more parameters.

Example 44 may include the eNodeB of example 43 or some other example herein, wherein the TDD UL/DL configuration for a radio frame is indicated via physical downlink control channel (PDCCH) or enhanced PDCCH (EPDCCH) or 5G PDCCH (xPDCCH) or dedicated RRC signalling or a combination of the above options from one serving cell in an anchor booster arrangement.

Example 45 may include the eNodeB of example 44 or some other example herein, wherein a DCI format with a cyclic redundancy check (CRC) scrambled by an enhanced interference mitigation and traffic adaptation (eIMTA)-Radio Network Temporary Identifier (RNTI) is reused to indicate a TDD UL/DL reconfiguration for the TDD network.

Example 46 may include the eNodeB of example 44 or some other example herein, wherein a new DCI format is introduced to indicate a TDD UL/DL reconfiguration for the TDD network; wherein a new RNTI is signaled through higher layers signaling to scramble the CRC bits; and wherein a same payload size as one of Rel-12 DCI formats is transmitted on or in a common search space (CSS).

Example 47 may include the eNodeB of example 44 or some other example herein, wherein the UL/DL configuration is selected from a subset of UL/DL configurations, wherein the subset of UL/DL configurations is semi-statically provided by higher layer via dedicated radio resource control (RRC) signalling or 5G system information block (xSIB).

Example 48 may include the eNodeB of example 43 or some other example herein, wherein booster cell subframes within a same anchor cell subframe follow a predefined or configured pattern as the anchor cell.

Example 49 may include the eNodeB of example 43 or some other example herein, wherein the TDD DL/UL configuration is indicated via the PTCICH transmission.

Example 50 may include the eNodeB of example 49 or some other example herein, wherein the PTCICH is transmitted in one or multiple subframes of one or a plurality of frames for a dynamic TDD system.

Example 51 may include the eNodeB of example 49 or some other example herein, wherein the PTCICH is transmitted in every downlink subframe and the UE only attempts to blindly decode the PDCCH/EPDCCH/xPDCCH if it detects the PTCICH.

Example 52 may include the eNodeB of example 43 or some other example herein, wherein the subject matter of any of examples 44, 48, and/or 49, or some other example herein, is combined to indicate the TDD DL/UL configuration.

Example 53 may include the eNodeB of example 52 or some other example herein, wherein a subset of TDD DL/UL configurations is signaled by either xPDCCH or dedicated RRC signalling from a primary cell (PCell), and the PTCICH is used to indicate one of the TDD DL/UL configurations in the serving cell.

Example 54 may include the eNodeB of example 49 or some other example herein, wherein for the generation of the PTCICH, a block coding is applied for the TDD UL/DL configuration; wherein a cell specific scrambling is applied after the coding; wherein binary phase-shift keying (BPSK) or quadrature phase-shift keying (QPSK) is used for the modulation; and wherein modulated symbols are mapped to the allocated resources.

Example 55 may include the eNodeB of example 54 or some other example herein, wherein the scrambling seed can be defined as a function of a physical cell ID and/or a virtual cell ID and/or subframe/slot/symbol index for the transmission of PTCICH.

Example 56 may include the eNodeB of example 54 or some other example herein, wherein in the case of single frequency network type of operation wherein multiple eNodeBs transmit the PTCICH simultaneously on the same time and frequency resource, the scrambling sequence can be initialized as a function of virtual cell ID or a cluster/sub-cluster ID.

Example 57 may include the eNodeB of example 54 or some other example herein, wherein PTCICH modulated symbols are divided into K groups, where each group includes M=N/K symbols or subcarriers; wherein K groups are well separated within the system bandwidth; and wherein the location of the K groups in the frequency domain may depend on the physical-layer cell identity.

Example 58 may include the eNodeB of example 54 or some other example herein, wherein reference symbols (RS) may or may not be inserted within each group for the transmission of PTCICH.

Example 59 may include the eNodeB of example 54 or some other example herein, wherein for centimeter wave (cmWave) and/or millimeter Wave (mmWave) bands, repeated or beamforming sweeping is used for the transmission of PTCICH.

Example 60 may include the eNodeB of example 59 or some other example herein, wherein the eNodeB may use the same Tx beamforming weights of 5G primary synchronization signal (xPSS) and/or 5G secondary synchronization signal (xSSS) to transmit the PTCICH in the same symbol.

Example 61 may include the eNodeB of example 49 or some other example herein, wherein the subframes that UE shall monitor for the PTCICH is defined as the downlink subframes or special subframes in TDD system satisfying:

$$\left(10 \times n_f + \left\lceil \frac{n_s}{2} \right\rceil - N_{OFFSET}\right) \bmod T_{PERIODICITY} = 0,$$

where $n_f$ and $n_s$ are radio frame number and slot number; $N_{OFFSET}$ and $T_{PERIODICITY}$ are the subframe offset and periodicity of the PTCICH, respectively; and wherein configuration index is predefined or configured by higher layers via 5G master information block (xMIB), 5G system information block (xSIB) and/or dedicated RRC signalling.

Example 62 may include the eNodeB of example 49 or some other example herein, wherein the periodicity, e.g., TDD-Configuration-Periodicity for the PTCICH transmission is predefined or configured by higher layers via xMIB, xSIB or dedicated RRC signalling; and wherein a subframe bit map with parameter "subframeBitMap" is used to signal the subframes that UE needs to monitor for the PTCICH within this configured periodicity, which may be repeated within the configured periodicity.

Example 63 may include the eNodeB of example 49 or some other example herein, wherein another bit map signaling is used to indicate that a set of subframes within a period (e.g. a radio frame of 5G) are reserved for UL transmission or a special subframe with one partial UL transmission with fixed length.

Example 64 may include a method comprising: receiving, by a user equipment (UE) in a fifth generation (5G) time division duplex (TDD) network, a downlink control information (DCI) format and/or a physical TDD configuration indicator channel (PTCICH) transmission from an evolved NodeB (eNodeB); and processing, by the UE, the DCI format and/or PTCICH transmission in accordance with one or more parameters related to a TDD uplink (UL)/downlink (DL) configuration in one radio frame and/or subframe.

Example 65 may include the method of example 64 or some other example herein, wherein the TDD UL/DL configuration for a radio frame is indicated via physical downlink control channel (PDCCH) or enhanced PDCCH (EPDCCH) or 5G PDCCH (xPDCCH) or dedicated RRC signalling or a combination of the above options from one serving cell in an anchor booster arrangement.

Example 66 may include the method of example 65 or some other example herein, wherein a DCI format with a cyclic redundancy check (CRC) scrambled by an enhanced interference mitigation and traffic adaptation (eIMTA)-Radio Network Temporary Identifier (RNTI) is reused to indicate a TDD UL/DL reconfiguration for the TDD network.

Example 67 may include the method of example 65 or some other example herein, wherein a new DCI format is introduced to indicate a TDD UL/DL reconfiguration for the TDD network; wherein a new RNTI is signaled through higher layers signaling to scramble the CRC bits; and wherein a same payload size as one of Rel-12 DCI formats is transmitted on or in a common search space (CSS).

Example 68 may include the method of example 65 or some other example herein, wherein the UL/DL configuration is selected from a subset of UL/DL configurations, wherein the subset of UL/DL configurations is semi-statically provided by higher layer via dedicated radio resource control (RRC) signalling or 5G system information block (xSIB).

Example 69 may include the method of example 64 or some other example herein, wherein booster cell subframes within a same anchor cell subframe follow a predefined or configured pattern as the anchor cell.

Example 70 may include the method of example 64 or some other example herein, wherein the TDD DL/UL configuration is indicated via the PTCICH transmission.

Example 71 may include the method of example 70 or some other example herein, wherein the PTCICH is transmitted in one or multiple subframes of one or a plurality of frames for a dynamic TDD system.

Example 72 may include the method of example 70 or some other example herein, wherein the PTCICH is transmitted in every downlink subframe and the UE only attempts to blindly decode the PDCCH/EPDCCH/xPDCCH if it detects the PTCICH.

Example 73 may include the method of example 64 or some other example herein, wherein the method of example 65, example 69 and/or example 70, or some other example herein, is combined to indicate the TDD DL/UL configuration.

Example 74 may include the method of example 73 or some other example herein, wherein a subset of TDD DL/UL configurations is signaled by either xPDCCH or dedicated RRC signalling from a primary cell (PCell), and the PTCICH is used to indicate one of the TDD DL/UL configurations in the serving cell.

Example 75 may include the method of example 70 or some other example herein, wherein for the generation of the PTCICH, a block coding is applied for the TDD UL/DL configuration; wherein a cell specific scrambling is applied after the coding; wherein binary phase-shift keying (BPSK) or quadrature phase-shift keying (QPSK) is used for the modulation; and wherein modulated symbols are mapped to the allocated resources.

Example 76 may include the method of example 75 or some other example herein, wherein the scrambling seed can be defined as a function of a physical cell ID and/or a virtual cell ID and/or subframe/slot/symbol index for the transmission of PTCICH.

Example 77 may include the method of example 75 or some other example herein, wherein in the case of single frequency network type of operation wherein multiple eNodeBs transmit the PTCICH simultaneously on the same time and frequency resource, the scrambling sequence can be initialized as a function of virtual cell ID or a cluster/sub-cluster ID.

Example 78 may include the method of example 75 or some other example herein, wherein PTCICH modulated symbols are divided into K groups, where each group includes M=N/K symbols or subcarriers; wherein K groups are well separated within the system bandwidth; and wherein the location of the K groups in the frequency domain may depend on the physical-layer cell identity.

Example 79 may include the method of example 75 or some other example herein, wherein reference symbols (RS) may or may not be inserted within each group for the transmission of PTCICH.

Example 80 may include the method of example 75 or some other example herein, wherein for centimeter wave (cmWave) and/or millimeter Wave (mmWave) bands, repeated or beamforming sweeping is used for the transmission of PTCICH.

Example 81 may include the method of example 80 or some other example herein, wherein the eNodeB may use the same Tx beamforming weights of 5G primary synchronization signal (xPSS) and/or 5G secondary synchronization signal (xSSS) to transmit the PTCICH in the same symbol.

Example 82 may include the method of example 70 or some other example herein, wherein the subframes that UE shall monitor for the PTCICH is defined as the downlink subframes or special subframes in TDD system satisfying:

$$\left(10 \times n_f + \left[\frac{n_s}{2}\right] - N_{OFFSET}\right) \bmod T_{PERIODICITY} = 0,$$

where $n_f$ and $n_s$ are radio frame number and slot number; $N_{OFFSET}$ and $T_{PERIODICITY}$ are the subframe offset and periodicity of the PTCICH, respectively; and wherein configuration index is predefined or configured by higher layers via 5G master information block (xMIB), 5G system information block (xSIB) and/or dedicated RRC signalling.

Example 83 may include the method of example 70 or some other example herein, wherein the periodicity, e.g., TDD-Configuration-Periodicity for the PTCICH transmission is predefined or configured by higher layers via xMIB, xSIB or dedicated RRC signalling; and wherein a subframe bit map with parameter "subframeBitMap" is used to signal the subframes that UE needs to monitor for the PTCICH within this configured periodicity, which may be repeated within the configured periodicity.

Example 84 may include the method of example 70 or some other example herein, wherein another bit map signaling is used to indicate that a set of subframes within a period (e.g. a radio frame of 5G) are reserved for UL transmission or a special subframe with one partial UL transmission with fixed length.

Example 85 may include a user equipment (UE) comprising:
radio frequency (RF) circuitry to receive a downlink control information (DCI) format and/or a physical TDD configuration indicator channel (PTCICH) transmission from an evolved NodeB (eNodeB) in a fifth generation (5G) time division duplex (TDD) cellular network; and
baseband circuitry coupled with the RF circuitry, the baseband circuitry to process the DCI format and/or PTCICH transmission in accordance with one or more parameters related to a TDD uplink (UL)/downlink (DL) configuration in one radio frame and/or subframe.

Example 86 may include the UE of example 85 or some other example herein, wherein the TDD UL/DL configuration for a radio frame is indicated via physical downlink control channel (PDCCH) or enhanced PDCCH (EPDCCH) or 5G PDCCH (xPDCCH) or dedicated RRC signalling or a combination of the above options from one serving cell in an anchor booster arrangement.

Example 87 may include the UE of example 86 or some other example herein, wherein a DCI format with a cyclic redundancy check (CRC) scrambled by an enhanced interference mitigation and traffic adaptation (eIMTA)-Radio Network Temporary Identifier (RNTI) is reused to indicate a TDD UL/DL reconfiguration for the TDD network.

Example 88 may include the UE of example 86 or some other example herein, wherein a new DCI format is introduced to indicate a TDD UL/DL reconfiguration for the TDD network; wherein a new RNTI is signaled through higher layers signaling to scramble the CRC bits; and wherein a same payload size as one of Rel-12 DCI formats is transmitted on or in a common search space (CSS).

Example 89 may include the UE of example 86 or some other example herein, wherein the UL/DL configuration is selected from a subset of UL/DL configurations, wherein the subset of UL/DL configurations is semi-statically provided by higher layer via dedicated radio resource control (RRC) signalling or 5G system information block (xSIB).

Example 90 may include the UE of example 85 or some other example herein, wherein booster cell subframes within a same anchor cell subframe follow a predefined or configured pattern as the anchor cell.

Example 91 may include the UE of example 85 or some other example herein, wherein the TDD DL/UL configuration is indicated via the PTCICH transmission.

Example 92 may include the UE of example 91 or some other example herein, wherein the PTCICH is transmitted in one or multiple subframes of one or a plurality of frames for a dynamic TDD system.

Example 93 may include the UE of example 91 or some other example herein, wherein the PTCICH is transmitted in every downlink subframe and the UE only attempts to blindly decode the PDCCH/EPDCCH/xPDCCH if it detects the PTCICH.

Example 94 may include the UE of example 85 or some other example herein, wherein the subject matter of any of examples 86, 90, and/or 91, or some other example herein, is combined to indicate the TDD DL/UL configuration.

Example 95 may include the UE of example 94 or some other example herein, wherein a subset of TDD DL/UL configurations is signaled by either xPDCCH or dedicated RRC signalling from a primary cell (PCell), and the PTCICH is used to indicate one of the TDD DL/UL configurations in the serving cell.

Example 96 may include the UE of example 91 or some other example herein, wherein for the generation of the PTCICH, a block coding is applied for the TDD UL/DL configuration; wherein a cell specific scrambling is applied after the coding; wherein binary phase-shift keying (BPSK) or quadrature phase-shift keying (QPSK) is used for the modulation; and wherein modulated symbols are mapped to the allocated resources.

Example 97 may include the UE of example 96 or some other example herein, wherein the scrambling seed can be defined as a function of a physical cell ID and/or a virtual cell ID and/or subframe/slot/symbol index for the transmission of PTCICH.

Example 98 may include the UE of example 96 or some other example herein, wherein in the case of single frequency network type of operation wherein multiple eNodeBs transmit the PTCICH simultaneously on the same time and frequency resource, the scrambling sequence can be initialized as a function of virtual cell ID or a cluster/sub-cluster ID.

Example 99 may include the UE of example 96 or some other example herein, wherein PTCICH modulated symbols are divided into K groups, where each group includes M=N/K symbols or subcarriers; wherein K groups are well separated within the system bandwidth; and wherein the location of the K groups in the frequency domain may depend on the physical-layer cell identity.

Example 100 may include the UE of example 96 or some other example herein, wherein reference symbols (RS) may or may not be inserted within each group for the transmission of PTCICH.

Example 101 may include the UE of example 96 or some other example herein, wherein for centimeter wave (cm-Wave) and/or millimeter Wave (mmWave) bands, repeated or beamforming sweeping is used for the transmission of PTCICH.

Example 102 may include the UE of example 101 or some other example herein, wherein the eNodeB may use the same Tx beamforming weights of 5G primary synchronization signal (xPSS) and/or 5G secondary synchronization signal (xSSS) to transmit the PTCICH in the same symbol.

Example 103 may include the UE of example 91 or some other example herein, wherein the subframes that UE shall monitor for the PTCICH is defined as the downlink subframes or special subframes in TDD system satisfying $$\left(10 \times n_f + \left[\frac{n_s}{2}\right] - N_{OFFSET}\right) \mod T_{PERIODICITY} = 0,$$

where $n_f$ and $n_s$ are radio frame number and slot number; $N_{OFFSET}$ and $T_{PERIODICITY}$ are the subframe offset and periodicity of the PTCICH, respectively; and wherein configuration index is predefined or configured by higher layers via 5G master information block (xMIB), 5G system information block (xSIB) and/or dedicated RRC signalling.

Example 104 may include the UE of example 91 or some other example herein, wherein the periodicity, e.g., TDD-Configuration-Periodicity for the PTCICH transmission is predefined or configured by higher layers via xMIB, xSIB or dedicated RRC signalling; and wherein a subframe bit map with parameter "subframeBitMap" is used to signal the subframes that UE needs to monitor for the PTCICH within this configured periodicity, which may be repeated within the configured periodicity.

Example 105 may include the UE of example 91 or some other example herein, wherein another bit map signaling is used to indicate that a set of subframes within a period (e.g. a radio frame of 5G) are reserved for UL transmission or a special subframe with one partial UL transmission with fixed length.

Example 106 may include an apparatus comprising means to perform one or more elements of a method described in or related to any of examples 1-105, or any other method or process described herein.

Example 107 may include one or more non-transitory computer-readable media comprising instructions to cause an electronic device, upon execution of the instructions by one or more processors of the electronic device, to perform one or more elements of a method described in or related to any of examples 1-105, or any other method or process described herein.

Example 108 may include an apparatus comprising logic, modules, and/or circuitry to perform one or more elements of a method described in or related to any of examples 1-105, or any other method or process described herein.

Example 109 may include a method, technique, or process as described in or related to any of examples 1-105, or portions or parts thereof.

Example 110 may include a method of communicating in a wireless network as shown and described herein.

Example 111 may include a system for providing wireless communication as shown and described herein.

Example 112 may include a device for providing wireless communication as shown and described herein.

Configurations can be realized according to the following clauses.

Clause 1. A user equipment suitable for use in a cellular communications network, the user interface comprising circuitry to:
receive a control signal from a first cell;
decode the control signal received from the first cell thereby to determine a second cell Time Division Duplex Uplink-Downlink (TDD UL-DL) configuration; and
communicate with the second cell having applied the second cell TDD UL-DL configuration in respect of subframes associated with the second cell.

Clause 2. The user equipment according to clause 1, wherein:
the subframe length associated with the second cell is different from the subframe length associated with the first cell.

Clause 3. The user equipment according to clause 2, wherein:
the subframe length associated with the second cell is less than the subframe length associated with the first cell.

Clause 4. The user equipment according to any preceding clause, wherein:
the second cell TDD UL-DL configuration is decoded from the control signal received from the first cell.

Clause 5. The user equipment according to any one of clauses 1 to 3, wherein:
the second cell TDD UL-DL configuration is determined from a first cell TDD UL-DL configuration that is decoded from the control signal received from the first cell.

Clause 6. The user equipment according to any preceding clause, wherein:
in determining the second cell TDD UL-DL configuration, for each set of second cell subframes overlapping in time with a corresponding first cell subframe, the UL-DL configuration applied to the set of second cell subframes is dependent on whether the corresponding first cell subframe is configured as an Uplink (UL) or Downlink (DL) subframe according to the first cell TDD UL-DL configuration.

Clause 7. The user equipment according to clause 6, wherein the UL-DL configuration applied to the set of second cell subframes is set according to an UL or DL association pattern comprising a mixture of UL and DL subframes, the association pattern being selected based on the corresponding first cell subframe.

Clause 8. The user equipment according to clause 6, wherein:
the UL-DL configuration applied to the second set of second cell subframes is an association pattern of repeated UL or DL subframes matching the corresponding first cell subframe.

Clause 9. A user equipment suitable for use in a cellular communications network, the user interface comprising circuitry to:
receive from a first cell a control signal comprising a Physical Downlink Control Channel (PDCCH) and a separate physical Time Division Duplex Uplink-Downlink configuration indicator channel (PTCICH);
decode from the PTCICH a Time Division Duplex Uplink-Downlink (TDD UL-DL) configuration; and
communicate with the first cell having applied the TDD UL-DL configuration in respect of subframes associated with the first cell.

Clause 10. The user equipment according to clause 9, the circuitry to:
decode the PTCICH prior to any decoding of the PDCCH.

Clause 11. The user equipment according to clause 9 or clause 10, wherein:
the PTCICH spans less than or equal to 32 Resource Elements.

Clause 12. A user equipment suitable for use in a cellular communications network, the user interface comprising circuitry to:
receive from a first cell a control signal comprising a physical Time Division Duplex Uplink-Downlink configuration indicator channel (PTCICH);
decode from the PTCICH a Time Division Duplex Uplink-Downlink (TDD UL-DL) configuration; and
communicate with the first cell having applied the TDD UL-DL configuration in respect of subframes associated with the first cell, wherein:
the PTCICH spans less than or equal to 32 Resource Elements.

Clause 13. The user equipment according to clause 12, wherein:
the control signal comprises a Physical Downlink Control Channel (PDCCH).

Clause 14. The user equipment according to any one of clauses 9 to 13, wherein:
the PTCICH is present in one or more subframes of a frame, the number of the one or more subframes being less than the total number of subframes in a frame.

Clause 15. The user equipment according to clause 14, wherein:
the PTCICH is present in the first subframe of every frame; and
the decoded TDD UL-DL configuration applies with respect to each subframe of the frame containing the PTCICH.

Clause 16. The user equipment according to clause 14, wherein:
the PTCICH is present in a plurality of subframes of a frame; and
the decoded TDD UL-DL configuration applies with respect to the subframe containing the PTCICH and the remaining subsequent subframes up until the next subframe containing the PTCICH.

Clause 17. The user equipment according to any one of clauses 9 to 16, the circuitry to:
enable Discontinuous Reception (DRX) for a subframe in the event that the user equipment has no scheduled UL grant and no PTCICH is detected in the subframe.

Clause 18. The user equipment according to any one of clauses 9 to 17, the circuitry configured to:

decode PDCCH for a subframe from the control signal in the event that the user equipment has no scheduled Uplink (UL) grant and a PTCICH is detected in the subframe.

Clause 19. The user equipment according to any preceding clause, the circuitry configured to:
is receive a second control signal from a second cell; and
decode from the second control signal a plurality of selectable TDD UL-DL configurations, wherein:
the TDD UL-DL configuration specifies one TDD UL-DL configuration from the plurality of selectable TDD UL-DL configurations.

Clause 20. The user equipment according to any preceding, comprising one or more of:
a screen, a keyboard, a memory port, an antenna, a speaker, a graphics processor.

Clause 21. An Evolved Node B (eNB) for use in a cellular communications network, the eNB comprising circuitry to:
determine based on a first cell Time Division Duplex Uplink-Downlink (TDD UL-DL) configuration relating to subframes associated with a first cell provided by the eNB a second cell TDD UL-DL configuration relating to subframes associated with a second cell; and
transmit a control signal to one or more User Equipments (UEs) in communication with the first cell, wherein:
the control signal comprises the second cell TDD UL-DL configuration.

Clause 22. An Evolved Node B (eNB) for use in a cellular communications network, the eNB comprising circuitry to:
transmit a control signal to one or more User Equipments (UEs) in communication with a first cell provided by the eNB, wherein:
the control signal comprises a first cell Time Division Duplex Uplink-Downlink (TDD UL-DL) configuration relating to subframes associated with the first cell and a second cell TDD UL-DL configuration relating to subframes associated with a second cell.

Clause 23. An Evolved Node B (eNB) for use in a cellular communications network, the eNB comprising circuitry to:
transmit a control signal to one or more User Equipments (UEs) in communication with a first cell provided by the eNB, wherein:
the control signal comprises a Physical Downlink Control Channel (PDCCH) and a separate physical Time Division Duplex Uplink-Downlink configuration indicator channel (PTCICH) comprising a first cell Time Division Duplex Uplink-Downlink (TDD UL-DL) configuration relating to subframes associated with the first cell.

Clause 24. An Evolved Node B (eNB) for use in a cellular communications network, the eNB comprising circuitry to:
transmit a control signal to one or more User Equipments (UEs) in communication with a first cell provided by the eNB, wherein:
the control signal comprises a physical Time Division Duplex Uplink-Downlink configuration indicator channel (PTCICH) comprising a first cell Time Division Duplex Uplink-Downlink (TDD UL-DL) configuration relating to subframes associated with the first cell; and
the PTCICH spans less than or equal to 32 Resource Elements.

Clause 25. The eNB according to any one of clauses 21 to 24, the eNB comprising circuitry to:
receive a control signal specifying second cell TDD UL-DL configuration information pertaining to a second cell; and
determine the first cell TDD UL-DL configuration based on the second cell TDD UL-DL configuration information.

Clause 26. A method of specifying an UL-DL configuration in a cellular communications network, the method comprising:
providing a first cell;
providing a second cell;
transmitting to one or more UEs in communication with the second cell a TDD UL-DL configuration with respect to subframes associated with the second cell based on a first cell TDD configuration with respect to subframes associated with the first cell.

Clause 27. A method of specifying an UL-DL configuration in a cellular communications network, the method comprising:
transmitting to one or more UEs in communication with a first cell a control signal comprising a PDCCH and a separate physical TDD UL-DL configuration indicator channel (PTCICH) comprising a TDD UL-DL configuration.

Clause 28. A method of specifying an UL-DL configuration in a cellular communications network, the method comprising:
transmitting to one or more UEs in communication with a first cell a control signal comprising a physical TDD UL-DL configuration indicator channel (PTCICH) comprising a TDD UL-DL configuration, wherein:
the PTCICH spans less than or equal to 32 Resource Elements.

Clause 29. A computer readable medium comprising computer program instructions that when executed on a processor perform the method according to any one of clauses 26 to 28.

The foregoing description of one or more implementations provides illustration and description, but is not intended to be exhaustive or to limit the scope of the disclosure to the precise form disclosed. Modifications and variations are possible in light of the above teachings or may be acquired from practice of various implementations of the disclosure.

The invention claimed is:

1. One or more non-transitory, computer-readable media having instructions that, when executed by one or more processors, cause a user equipment (UE) to:
receive a control signal from a first cell;
decode the control signal received from the first cell thereby to determine a second cell Time Division Duplex Uplink-Downlink (TDD UL-DL) configuration, wherein a subframe corresponding to the first cell has a first length and a subframe corresponding to the second cell has a second length, the second length of a subframe corresponding to the second cell being different from the first length of a subframe corresponding to the first cell; and
communicate with the second cell having applied the second cell TDD UL-DL configuration in respect of subframes associated with the second cell,
wherein the second cell TDD UL-DL configuration is determined from a first cell TDD UL-DL configuration that is decoded from the control signal received from the first cell.

2. The one or more non-transitory, computer-readable media of claim 1, wherein:
the second length of a subframe corresponding to the second cell is less than the first length of a subframe corresponding to the first cell.

3. The one or more non-transitory, computer-readable media of claim 2, wherein:
in determining the second cell TDD UL-DL configuration, for each set of second cell subframes overlapping in time with a corresponding first cell subframe, the second cell UL-DL configuration applied to the set of second cell subframes is dependent on whether the corresponding first cell subframe is configured as an Uplink (UL) or Downlink (DL) subframe according to the first cell TDD UL-DL configuration.

4. The one or more non-transitory, computer-readable media of claim 3, wherein the second cell UL-DL configuration applied to the set of second cell subframes is set according to an UL or DL association pattern comprising a mixture of UL and DL subframes, an association pattern being selected based on the corresponding first cell subframe.

5. The one or more non-transitory, computer-readable media of claim 3, wherein:
the second cell UL-DL configuration applied to the set of second cell subframes is an association pattern of repeated UL or DL subframes matching the corresponding first cell subframe.

6. The one or more non-transitory, computer-readable media of claim 1, wherein the control signal comprises a physical Time Division Duplex Uplink-Downlink configuration indicator channel (PTCICH) and the instructions, when executed, further cause the UE to decode from the PTCICH the first cell TDD UL-DL configuration, wherein:
the PTCICH spans less than or equal to 32 Resource Elements.

7. The one or more non-transitory, computer-readable media of claim 6, wherein:
the control signal comprises a Physical Downlink Control Channel (PDCCH).

8. The one or more non-transitory, computer-readable media of claim 7, wherein the instructions, when executed, further cause the UE to:
decode PDCCH for a subframe from the control signal in the event that the UE has no scheduled Uplink (UL) grant and a PTCICH is detected in the subframe.

9. The one or more non-transitory, computer-readable media of claim 6, wherein:
the PTCICH is present in one or more subframes of a frame, a number of one or more subframes being less than a total number of subframes in a frame.

10. The one or more non-transitory, computer-readable media of claim 9, wherein:
the PTCICH is present in the first subframe of every frame; and
the decoded first cell TDD UL-DL configuration applies with respect to each subframe of the one or more subframes of the frame containing the PTCICH.

11. The one or more non-transitory, computer-readable media of claim 9, wherein:
the PTCICH is present in a plurality of subframes of a frame; and
the decoded first cell TDD UL-DL configuration applies with respect to the subframe containing the PTCICH and remaining subsequent subframes up until a next subframe containing the PTCICH.

12. The one or more non-transitory, computer-readable media of claim 6, wherein the instructions, when executed, further cause the UE to:
enable Discontinuous Reception (DRX) for a subframe in the event that the UE has no scheduled UL grant and no PTCICH is detected in the subframe.

13. The one or more non-transitory, computer-readable media of claim 1, wherein the first cell corresponds to one of a fourth generation (4G) long-term evolution (LTE) or long-term evolution-advanced (LTE-A) cell, and the second cell corresponds to a fifth generation (5G) cell.

14. The one or more non-transitory, computer-readable media of claim 1, wherein receiving the control signal from the first cell comprises receiving the control signal from the first cell in a cellular communications access network,
wherein communicating with the second cell comprises communicating with the second cell in the cellular communications access network,
and wherein the length of a subframe corresponding to the first cell or the second cell comprises a temporal duration of the subframe corresponding to the first cell or the second cell.

15. A user equipment (UE) comprising:
interface circuitry to receive a control signal from a first cell; and
processing circuitry to:
decode the control signal received from the first cell to determine a second cell Time Division Duplex Uplink-Downlink (TDD UL-DL) configuration, wherein a subframe corresponding to the first cell has a first length and a subframe corresponding to the second cell has a second length, the second length of a subframe corresponding to the second cell being different from the first length of a subframe corresponding to the first cell; and
communicate with the second cell having applied the second cell TDD UL-DL configuration in respect of subframes associated with the second cell,
wherein the second cell TDD UL-DL configuration is determined from a first cell TDD UL-DL configuration that is decoded from the control signal received from the first cell.

16. The UE of claim 15, wherein the control signal comprises a physical Time Division Duplex Uplink-Downlink configuration indicator channel (PTCICH), and the processing circuitry is to decode the PTCICH to determine the first cell TDD UL-DL configuration.

17. The UE of claim 15, wherein:
the control signal is a first control signal;
the interface circuitry is further to receive a second control signal from the second cell; and
the processing circuitry is further to decode from the second control signal a plurality of selectable TDD UL-DL configurations, wherein: the first cell TDD UL-DL configuration specifies one second cell TDD UL-DL configuration from the plurality of selectable TDD UL-DL configurations.

18. The UE of claim 15, wherein the second length of a subframe corresponding to the second cell is less than the first length of a subframe corresponding to the first cell.

19. The UE of claim 15, wherein the first cell corresponds to one of a fourth generation (4G) long-term evolution (LTE) or long-term evolution-advanced (LTE-A) cell, and the second cell corresponds to a fifth generation (5G) cell.

20. A base station in a cellular network, the base station comprising:
processing circuitry to:
generate, for sending to a user equipment (UE), a control signal corresponding to a first cell associated with the base station, the control signal including information to determine a second cell Time Division Duplex Uplink-Downlink (TDD UL-DL) configuration, wherein a subframe corresponding to the first cell has a first length and a subframe corresponding to the second cell has a second length, the second length of a subframe corresponding to the second cell being different from the first length of a subframe corresponding to the first cell; and
interface circuitry to send the control signal to the UE.

21. The base station of claim 20, wherein the information in the control signal includes a first cell TDD UL-DL configuration, and
wherein the second cell TDD UL-DL configuration is determined by the UE from the first cell TDD UL-DL configuration.

\* \* \* \* \*

UNITED STATES PATENT AND TRADEMARK OFFICE
CERTIFICATE OF CORRECTION

| | | |
|---|---|---|
| PATENT NO. | : 10,959,212 B2 | Page 1 of 1 |
| APPLICATION NO. | : 15/747270 | |
| DATED | : March 23, 2021 | |
| INVENTOR(S) | : Gang Xiong et al. | |

It is certified that error appears in the above-identified patent and that said Letters Patent is hereby corrected as shown below:

In the Claims

Column 33, Line 53, in Claim 10, delete "of the" and insert -- of --.

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*